United States Patent
Strellis et al.

(12) 
(10) Patent No.: US 6,304,882 B1
(45) Date of Patent: *Oct. 16, 2001

(54) DATA REPLICATION SYSTEM AND METHOD

(75) Inventors: Eric G. Strellis, Albany; Alan Bram; Richard N. Hillegas, both of San Francisco; Jeffrey Lichtman, El Cerrito; Nathaniel G. Wyatt, Berkeley, all of CA (US)

(73) Assignee: Informix Software, Inc., Menlo Park, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/073,098

(22) Filed: May 5, 1998

(51) Int. Cl.⁷ .................................... G06F 17/30

(52) U.S. Cl. ...................... 707/202; 707/203; 707/204

(58) Field of Search .................... 707/201, 202, 707/203, 204, 8, 10, 101; 709/216, 217, 218, 201

(56) References Cited

U.S. PATENT DOCUMENTS

| | | | | |
|---|---|---|---|---|
| 5,737,601 | * | 4/1998 | Jain et al. | 707/201 |
| 5,832,514 | * | 11/1998 | Norin et al. | 709/220 |
| 5,890,167 | * | 3/1999 | Bridge, Jr. et al. | 707/204 |
| 5,937,414 | * | 8/1999 | Souder et al. | 707/203 |
| 5,960,200 | * | 9/1999 | Eager et al. | 395/705 |

* cited by examiner

Primary Examiner—Wayne Amsbury
Assistant Examiner—Thu-Thao Havan
(74) Attorney, Agent, or Firm—Fish & Richardson P.C.

(57) ABSTRACT

A data replication processing system includes a source database system and one or more target database systems all of which are coupled through a network. The replication processing system provides a replication protocol that allows for the source database and the target databases to remain consistent and in agreement. A method for the replication processing system includes having a target database request a refresh of its subset of the source database from the source database system. The source database system receives the refresh request message and constructs a refresh reply message that includes transactions from the source and the target. The target database system receives the refresh reply message from the source database system and applies the changes to its subset of the source database so that the two databases are in agreement with respect to their appropriate data sets.

22 Claims, 17 Drawing Sheets

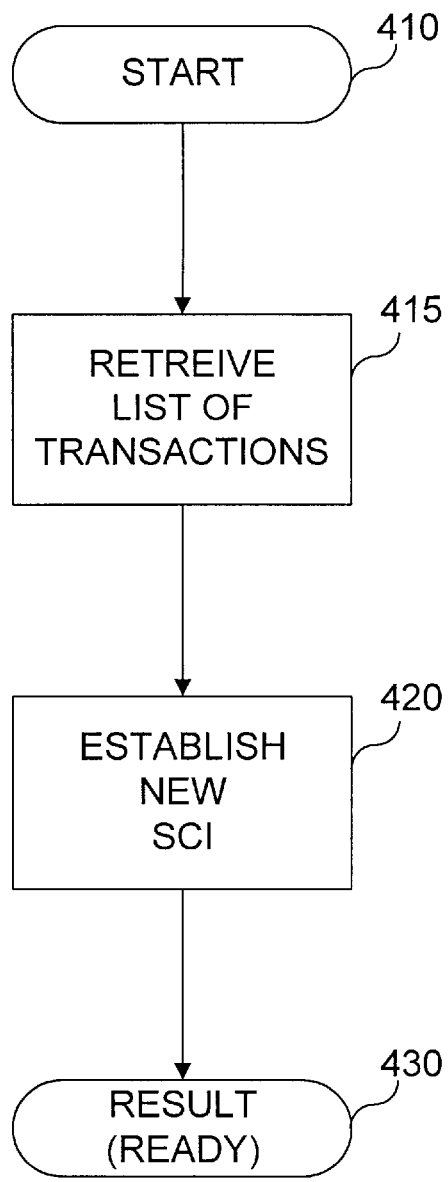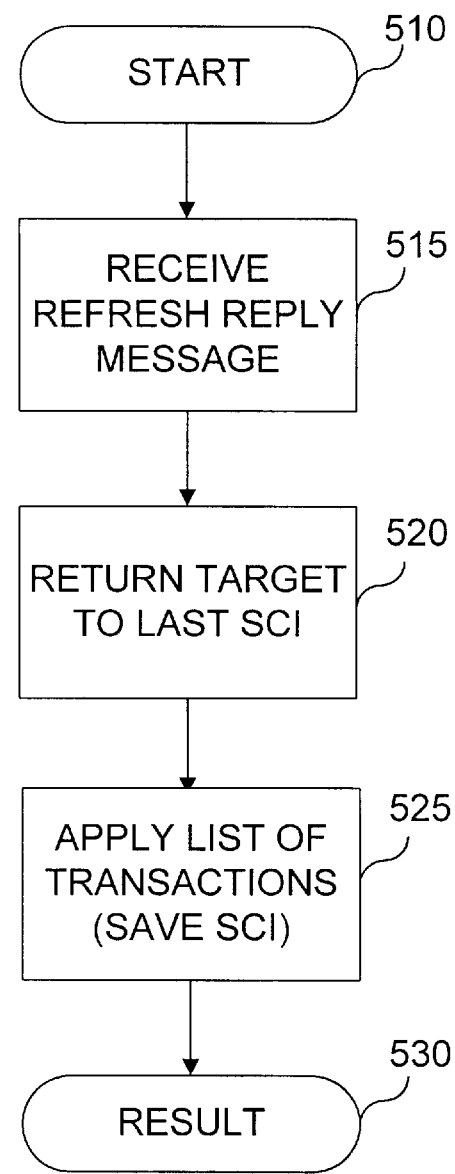
FIG. 4
FIG. 5

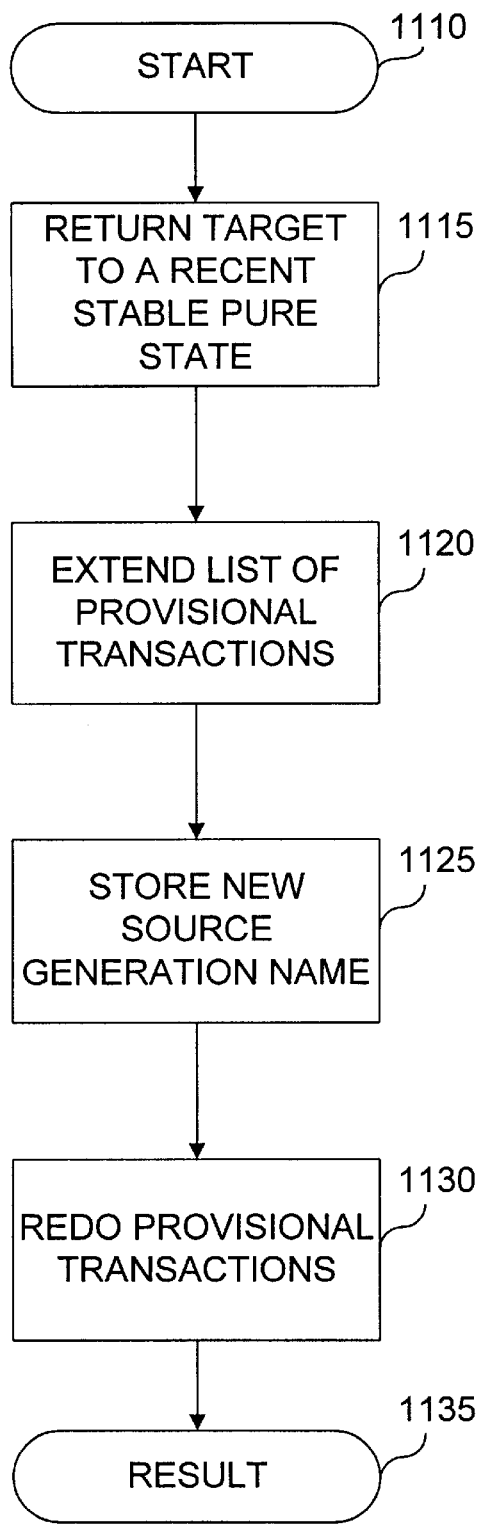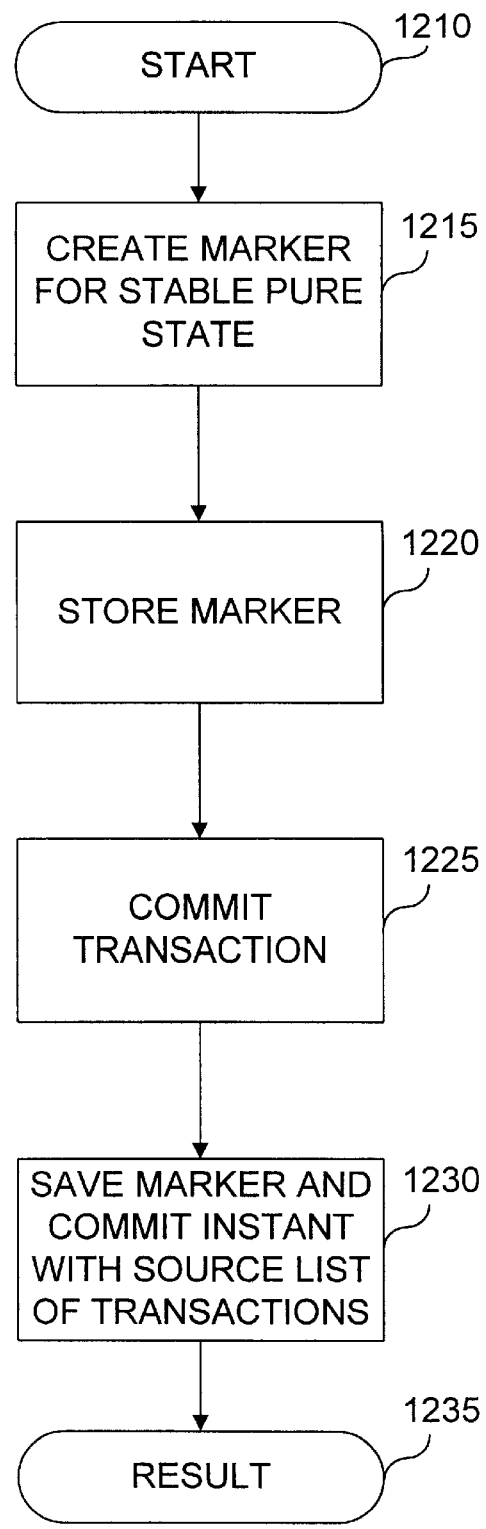
*FIG. 11*       *FIG. 12*

DATA REPLICATION SYSTEM AND METHOD

BACKGROUND OF THE INVENTION

1. Field of the Invention

The present invention relates to design of distributed data systems and methods, and more particularly, to design of data replication systems and methods.

2. Description of the Related Art

Distributed data systems (and methods) use a central database with copies of that database distributed to client computers within the system. For example, in a conventional distributed data system having a central server computer and one or more client computers, each client computer uses a copy of the central database or data repository that is located on the server computer. Each client computer performs computer application functions and operations using the copy of the database. To keep each copy of the database at the client computer matching with the central database located at the server computer, conventional distributed data systems use conventional data replication systems.

Conventional data replication systems provide high data availability and enhance performance by allowing a copy of the database to be moved from the server computer to the client computers thereby eliminating or removing system bottlenecks such as numerous input/output operations with the server computer. Conventional data replication systems, however, have a number of drawbacks.

First, many conventional replication systems only allow for computer applications to "read" the copy of the database at the client computer. To ensure consistency and agreement, these conventional replication systems do not perform both a "read" and a "write" with the copy of the server database. Specifically, these conventional replication system are concerned with the data integrity of the server database becoming compromised if, for example, a copy of the database on the client computer is updated but the central database on the server computer is not properly updated. Read only data replication systems, therefore, are not well suited for computer applications that perform transactional functions and operations at the client computer.

Other conventional replication systems allow both "reads" and "writes" to the copy of the server database at the client computer. These conventional replication systems, however, cannot guarantee agreement and consistency between the server database itself and the copy of the server database. In particular conventional replication systems are unable to correctly serialize transactions that are applied to the various copies of the server database. Moreover, transactions cannot be serialized in such systems without adversely affecting overall system performance.

It is noted that a database is considered "consistent" if it satisfies all applicable user defined consistency rules so that the source database also remains consistent. Further, "agreement" refers to having all copies of a database agree despite minor differences between the copies resulting from latency. The copies of a database in a correctly functioning replication system must be in agreement, although they may never actually match. Second, data replication systems that do allow both "read" and "write" transactions lack a protocol that ensures that each client database is in agreement with both the server database and the other client databases.

A third problem with conventional data replication systems arises from the use of locks to prevent conflicts between transactions that access different copies. Such locks are not practical for a number of reasons. For example, a lock must be visible to every transaction that accesses a copy of the database. This is not possible for copies of the database on client computers that are disconnected from the network. In a connected environment, the cost of acquiring a lock that is visible to all copies of the database is prohibitive because making a lock usable across a network requires passing of messages.

Another problem with using locks to serialize transactions against different copies of a database is that if a lock is visible over an unreliable network, very difficult failure situations arise, such as network partitions. Moreover, if the server database is no longer in agreement with the copies of the database at the client databases, there is an increased probability that the data in the distributed data system may become compromised. Once the data is compromised, the system fails. Thus, conventional data replication systems allowing both "read" and "write" transactions are not suitable for mission critical distributed data systems where maintaining data integrity is essential.

With conventional replication data processing systems it is difficult to build an automatic mechanism to guarantee agreement when transactions that update different copies of the database at different computers conflict. Aspects of the problem which contribute to the difficulty include requiring the mechanism to respect the consistency rules for the database. These rules may be complex. Often no declarative form of these rules exists. In fact for many applications the only practical way to specify the consistency rules for a database is to write complex procedural logic, specifically, triggers.

A fourth problem with conventional data replication systems occurs when transactions at two different copies conflict. Here, it is possible for an arbitrary number of additional transactions that depend on changes made by the conflicting transactions to occur. Conventional replication systems do not assure that after correcting one or both of the conflicting transactions, that changes made by these dependent transactions do not corrupt the server database, i.e., that they still make sense and they still respect the database's consistency rules.

A fifth problem with conventional data replication systems is that there is no guarantee of data recovery if a server database loses a transaction. For example, if a server database fails, e.g., crashes, and loses a portion of its recovery log, it may be unable to recover transactions from the damaged section of the log. The server database will lose such transactions. In the case that the target database holds a transaction that the server database loses, conventional replication systems become confused.

A sixth problem with conventional data replication systems is that they do not typically automate the distribution aspects of a computer software upgrade such that the client computer remains operable and the database useable. Many existing data replication systems require new software or upgrade utility installations on every client computer. During the installation process, the client computer must remain unusable so that the database is not corrupted. To be successful, the installation must be well planned, including recovery plans in the event that the upgrade fails. The installation must also be well tested and run at times when the client computers are least used so that the process is least disruptive. Thus, existing data replication systems are unwieldy, especially in large installations, for example having 10,000 client computers and are not well suited in increments requiring a high degree of client computer availability.

Therefore, there is a need for a data replication system and method that (1) allows for replicating or copying a source database across multiple client computers and (2) allows each client computer to freely transact, i.e., both "read" and "write," with the copy of the database while (3) providing database consistency to ensure data integrity and (4) allowing for complete disaster recovery.

SUMMARY OF THE INVENTION

The present invention includes a data replication processing system and method. The replication processing system comprises a source database system that includes a source database and a target database system that includes a target database. The source database system and the target database system are coupled through a network. The target database holds a subset of the source database.

The data replication processing system allows for a method to update both the source database and the target database so that at a given instant the data set at the source database is in agreement with the data set of the target database. The method generates a refresh request message at the target database system for delivery to the source database system. The refresh request message includes a list of provisional transactions applied to the target database since a last refresh operation was performed by the replication processing system.

The refresh request message is received by the source database system, which applies the provisional transactions to its source database. The source database system constructs a refresh reply message for delivery to the target database system. The refresh reply message includes a list of transactions it has applied to the source database since the last refresh operation. These transactions include the provisional transactions from target database.

The refresh reply message is received by the target database system, which undoes its provisional transactions. Undoing the provisional transactions returns the target database to a state that existed after the last refresh operation. The target database system applies the source transactions from the refresh reply message to the target database. The source database and the target database now match. This new state of the source database and the target database is saved as a source commit instant, and may be referenced for future refresh operations.

If the target database system received additional provisional transactions after generating and sending its refresh request message, those transactions are saved in a storage of the target database system. These transactions are referred to as stranded transactions and are applied to the target database after the transactions from the refresh reply message are applied.

The replication processing system of the present invention also includes a method for restoring agreement between the source database and the target database in the event of a database failure, e.g., a source database crash, automatically (i.e., without user intervention). The method provides a generation name of the source database to the target database system that is stored in storage by the target database system. The target database system includes the generation name in a refresh request message to the source database system. The generation name changes when the source database system recovers from a database failure.

The source database system verifies that the generation name received from the target database system matches the generation name of the source database. If the generation names do not match, the source database system sends a recover message, that includes a new generation name for the source database, to the target database system. The target database system receives the recover message and stores the new generation name for the source database.

The target database system returns the target database to a stable pure state. The stable pure state is a most recent state of the target database that has only transactions not lost by the source database. Once at the stable pure state, the target database system extends the list of provisional transactions to include all local transactions stored by the target database system since the last stable pure state. The target database system then performs a refresh operation to redo the provisional transactions at the target database and the source database.

The replication processing system also includes a method for upgrading an application in the target database system. Specifically, the replication processing system appends an application identifier and a first application version for the application to a refresh request message. The source database system receives the application information in the refresh request message and builds an upgrade reply message in response to the first application version being older than a second application version of the application at the source database system.

The source database system transmits the upgrade reply message to the target database system. The upgrade reply message includes an upgrade block that has the application identification, the first application version, the second application version, and data bytes for upgrading the application. The target database system performs an upgrade of the application at the target database system using the upgrade block received in the upgrade reply message.

It is noted that the data replication system in one embodiment includes at least one processor for processing source transactions and provisional transactions for the source database or the target database. It also includes at least one memory, a memory coupled to a processor, for storing the source transactions and the provisional transactions and instructions. The instructions are executed by the processor to cause the processor to update the data set by causing the processor to perform particular steps for a data replication process.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 4 is a flow diagram illustrating one embodiment for constructing a refresh reply message in a replication processing system in accordance with the present invention;

FIG. 5 is a flow diagram illustrating one embodiment of application of the refresh reply message in a replication processing system in accordance with the present invention;

FIG. 11 is a flow diagram illustrating a correction process for a failure in a replication processing system in accordance with the present invention;

FIG. 12 is a flow diagram illustrating a marker transaction in the replication processing system in accordance with the present invention;

DETAILED DESCRIPTION OF THE PREFERRED EMBODIMENTS

A preferred embodiment of the present invention will be described with reference to the Figures, where like reference numbers typically indicate identical or functionally similar elements. The present invention includes a system and a method for data replication in a distributed environment.

System Overview

Figure 1A:
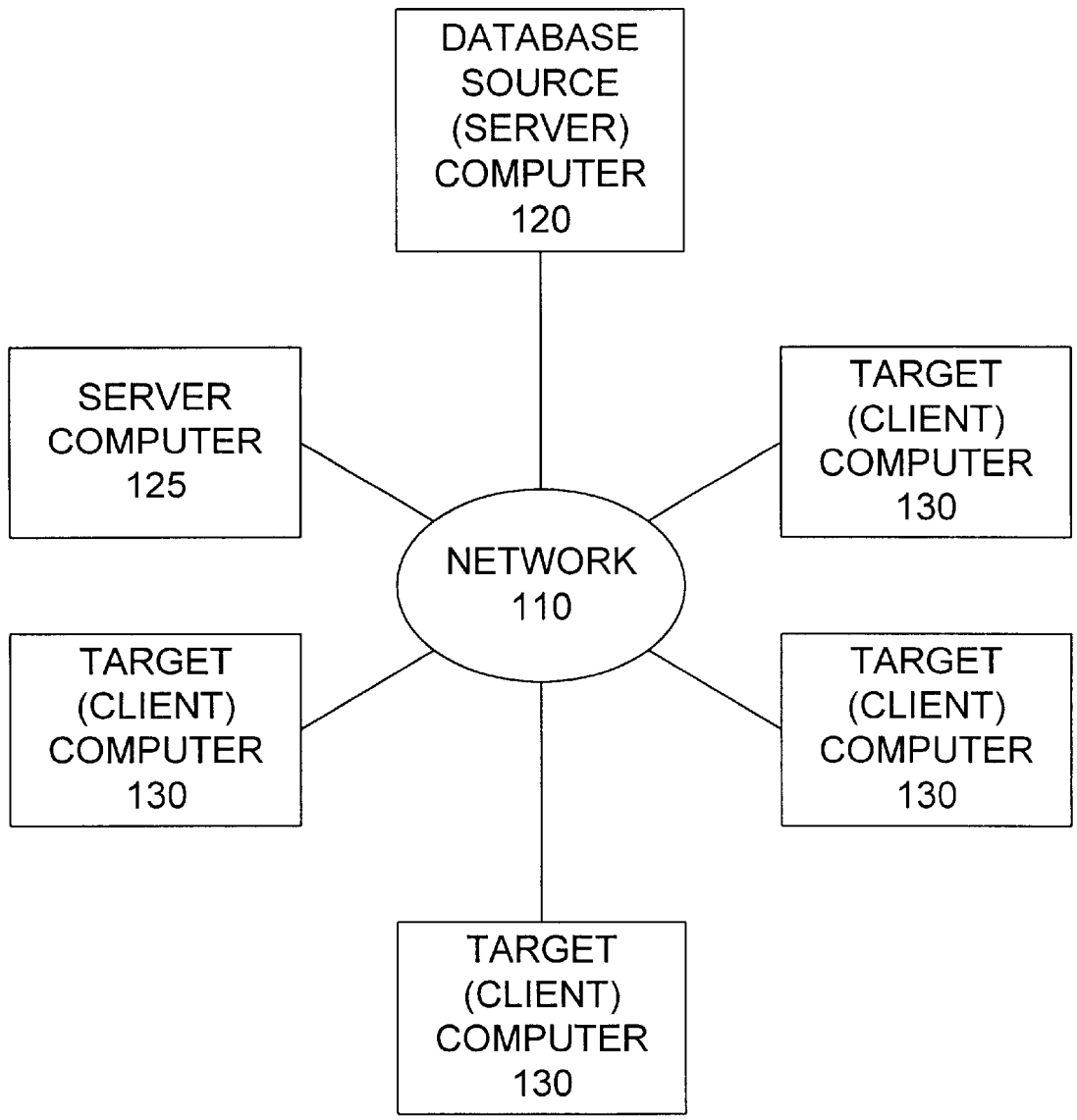
FIGS. 1a and 1b are block diagrams illustrating one embodiment of a data processing system in accordance with the present invention.
Figure 1B:
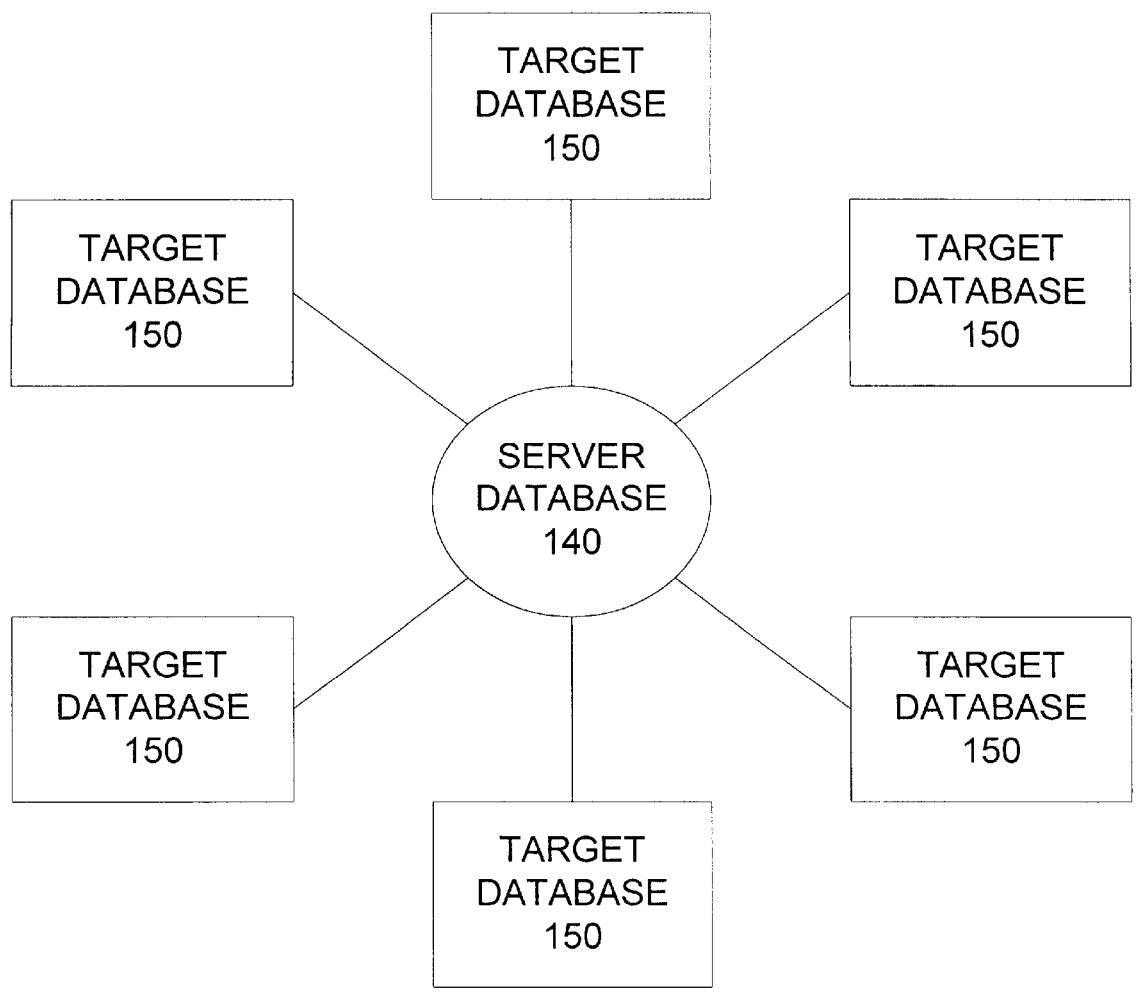

FIGS. 1a and 1b are block diagrams illustrating one embodiment of a data processing system in accordance with the present invention. FIG. 1a illustrates a physical layout of data processing system 105a that includes a computer network 110, a database server computer 120, a general server computer 125, and one or more client computers 130. It is noted that the general server computer 125 may be optional. The database server computer 120 may also be referred to as the database source computer 120 and the client computer 130 may also be referred to as target computers 130.

In the data processing system 105a the server computers 120, 125 and the client computers 130 are all coupled to the computer network 110. The computer network 110 facilitates communications between the computers 120, 125, 130.

The computer network 110 is capable of delivering bytes of data, e.g., messages, from one computer, e.g., the server computer 120, to another computer, e.g., the database target computer 130. The computer network 110 may be a local area network ("LAN"), wide area network ("WAN") (e.g., the Internet), a telecommunications network, a computer component network (e.g., a file transfer system), a message-based network, or other functionally equivalent data transfer network system. Further, the computer network 110 may be comprised of one or more networks that are coupled together to form a single logical network system and that supports an appropriate protocol (e.g., TCP/IP for the Internet).

The server computers 120, 125 may be any computer capable of handling computer server functions. For example, an IBM mainframe or mid-range computer server, a Sun Microsystems or other RISC based computer server system, an Apple Computer server, an Intel-processor based server computer; or other functionally equivalent computer. The server also runs appropriate operating system software, for example, IBM VM or AIX, Sun OS or Solaris, Apple System 8 (or later), or Microsoft Windows NT or Windows 95 (or later).

The client computer 130 may be any computer capable of handling client computer functions, for example, another server computer operating in a client mode, a Sun Microsystems or other RISC-based workstation, an Intel-processor based workstation, a personal digital assistant, a processor based controller, or other functionally equivalent computer. Each client also runs appropriate operating system software, for example, IBM AIX, Sun OS or Solaris, or Microsoft Windows NT or Window 95 (or later).

FIG. 1b illustrates an embodiment of a logical configuration 105b of the data processing system illustrated in FIG. 1a in accordance with the present invention. In the logical configuration 105b, a hub-and-spoke topology includes a server or source system and one or more client or target systems. The server system and the target system may be, for example, any data or file storage system or facility that supports transactions. For example, the server system and the target system may be a database system, a file transactional system, or the like. In one embodiment, the source system is a source database system 140 and the target system is a target database system 150.

Each target database system 150 is coupled to the source database system 140. The source database system 140 is the "hub" database and each target database system 150 is a "spoke" database. It is noted that the source database system 140 may be comprised of one or more databases that are coupled together as a single logical source database. Similarly any or all of the target database systems 150 may be comprised of one or more databases that are coupled together as a single logical target database. Each target database system 150 is autonomous and is a cached subset (e.g., a subset copy) of the source database system 140.

In one embodiment of the present invention, the source database system 140 is resident on the database server computer 120 while each target database system 150 is resident on a client computer 130. It is noted, however, that both the source database system 140 and the target database system 150 may be resident on either the server computer 120 or the client computer 130. Further, in the logical hub-and-spoke configuration 105b, an application may be deployed with the one or more target database systems 150 on the client computer 130. Because only a subset of the source database system 140 that is relevant to the application at the client computer 130 is provided for the target database system 150, processing and storage resources on the client computer 130 are saved.

Also, in a preferred embodiment of the present invention the source database system 140 and the target database system 150 are enabled and implemented in a Sun Microsystems' Java™ software environment. Further, in a preferred embodiment the source database system 140 and the target database system 150 execute in a single Java Virtual Machine ("JVM"). Moreover, the single JVM may be executing on one computer or among multiple computers. The present invention may also be configured so that the source database system 140 runs in one JVM and the target database system 150 runs in a second JVM. It is noted that one skilled in the art will recognize that present invention may be enabled and implemented in other functionally similar software environments.

During operation of the data processing system 105 (105a, 105b), the target database system 150 caches a subset of the data from the source database system 140. Having a cached subset of the data allows the client computer 130 (and its target database system 150) to operate disconnected from the computer network 110 as well as the server computer 120 (and its source database system 140).

The source database system 140 publishes data available for caching. In one embodiment, the data includes, for example, database software, SQL dictionary objects such as tables, views, indexes, and triggers, and the contents of published SQL tables, including a row and a column subset (s). It is noted that the contents of the tables may include, for example, executable application code, conventional application data, and non-conventional application data such as web page configuration files.

Figure 2:
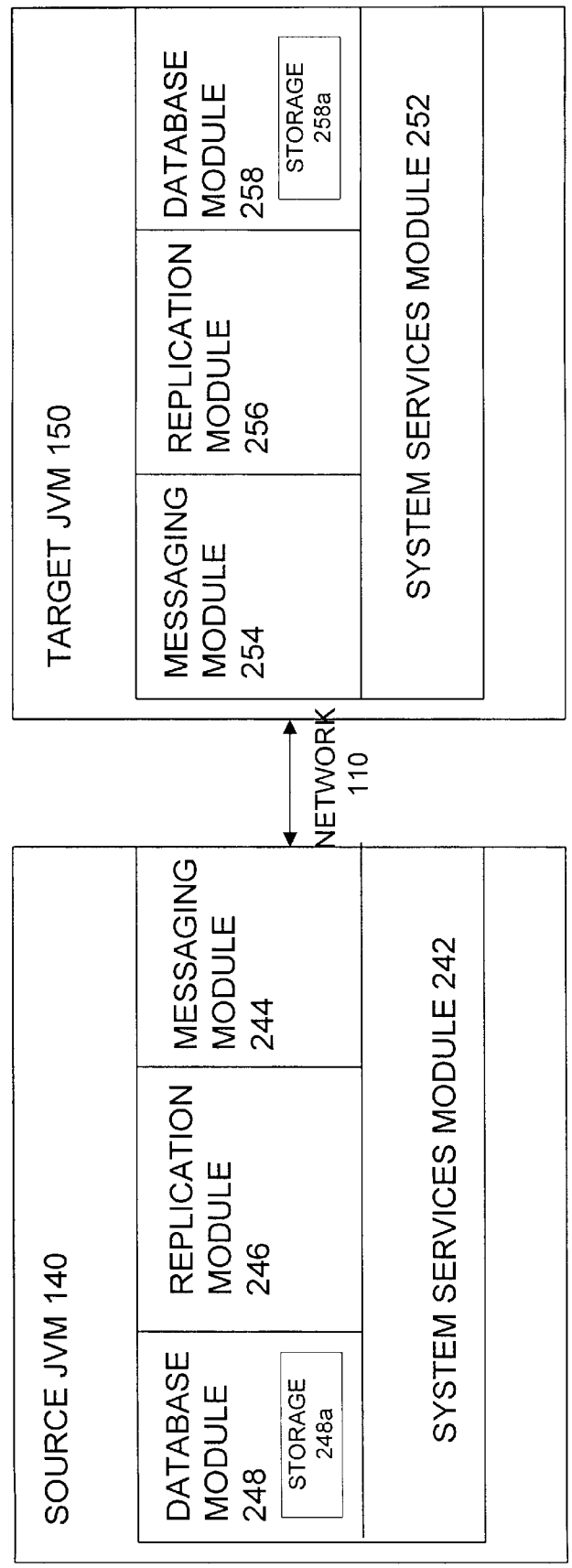
FIG. 2 is a block diagram illustrating one embodiment of a replication processing system in accordance with the present invention.

FIG. 2 is a block diagram illustrating one embodiment of a replication data processing system 205 that includes the source database system 140 and the target database system 150 in accordance with the present invention. As discussed above, each system 140, 150 is running in its own JVM.

Each database system 140, 150 includes a storage module 248a, 258a, a system services module 242, 252, a messaging module 244, 254, a replication module 246, 256, and a database module 248, 258. The messaging module 244, 254, the replication module 245, 256, and the database module 248, 258 are coupled to the system services module 242, 252. The replication module 246, 256 is coupled to the messaging module 244, 254 and the database module 248, 258. The respective storage module 248a, 258, is coupled with the respective database module 248, 258.

The storage module 248a, 258a provides information (or data) storage within each database system 140, 150. The storage module 248a, 258a may be, for example, a random access memory, a flash memory, a hard-disk drive, a writeable CD-ROM, or other functionally equivalent component.

The system services module 242, 252 provides low-level system capabilities including creation of a universally unique identifier ("UUID"). The UUID is a conventional UUID as described in "DEC/HP Network Computing Architecture, Remote Procedure Call Runtime Extensions Specification, Version OSF TX 1.0.11," by Steven Miller (Jul. 23, 1992) (from the Open Software Foundation standards) and is hereby incorporated by reference.

For simplicity, operation of the replication processing system 205 will be described from a target database system 150 perspective. One skilled in the art will appreciate that the general principles of operation also apply to other target database systems 150 as well as the source database system 140 perspective.

The database module 248, 258 provides conventional data management services. In addition, the database module 248, 258 also collects changes to the published data and makes these changes available to the replication module 246, 256. Organization and use of the changes by the database module 248, 258 and the replication module 246, 256 is further described below. The database module 248, 258 also provides database recovery services, as is also further described below.

The replication module 246, 256 implements a replication protocol in accordance with the present invention. To implement the replication protocol, the replication module 246, 256 provides services such as, for example, defining a set of published data, initializing a target database system 150 to hold a correct cached subset of the data from the source database system 140, and performing a refresh operation on a target database system 150. The refresh operation makes the cached data at the target database system 150 more current by applying changes made by the target database system 150 to the source database system 140 as well as applying changes made by the source database system 140 to the target database system 150. The refresh operation is further described below.

The messaging module 244, 254 delivers messages, or streams of bytes, from the respective replication module 246, 256 in one database system 140, 150 to the respective replication module 246, 256 in the other database system 140, 150. The replication module 246, 256 uses the messaging module 244, 254 to transmit information between the source database system 140 and the target database systems 150.

It is noted that the computer network 110 may lose, permute, duplicate or truncate messages. Regardless, the messaging module 246, 256 must not change the value of a byte that it delivers. It is noted that the messaging module 246, 256 provides addressing information for sending messages and lets a message recipient know the identity of the message sender. The messaging module 246, 256 is further described below.

Definitions

To assist with describing the operation of the present invention, some terms are generally defined. Specifically, a reference to "ACID properties of a transaction" means that a particular transaction is atomic, consistent, independent and durable. For example, a transaction is "consistent" if it satisfies all applicable user defined consistency rules so that the source database also remains consistent. A transaction is "durable" when it will not be revoked by the source database system. For example, in the present invention, a transaction may not be revoked once it is committed by the source database system 140 and, thus, becomes durable.

A "provisional transaction" is a transaction that was applied at a target database but not yet at the source database. The provisional transaction may be revoked by replication protocol.

A copy of the source database is considered "pure" if it reflects only source database system 140 transactions that have been applied in the same order the source database applied them. The source database itself is always considered to be pure.

A database "agrees" or is in "agreement" when all copies of the source database agree despite minor differences between the copies resulting from latency. The copies of the source database in a correctly functioning replication system must be in agreement, although they may never actually match.

The replication system is considered "correct" if all copies of the source database are consistent and agree. The source database system 140 enforces all user defined consistency rules and holds a correct copy of the source database by definition. A target database is correct if it is consistent and agrees with the source database.

A "conflict" occurs where two transactions are executing in different copies of the source database so that the changes made by one copy causes changes made by the other copy to corrupt the source database. Further, transactions that do not modify copies of the same data item can conflict. For example, consider transactions that modify the same data item and conflict. That is, transaction T1 inserts a person with social security number 111-22-3333 at copy C1. Transaction T2 inserts another person with the same social security number at copy C2. The corruption here is that social security numbers should be unique. Looking at another example, transactions that do not modify the same data can conflict. Transaction T1 deletes the sales department from copy C1. Transaction T2 hires a salesman at copy C2. The corruption here is that every employee should be in an existing department.

A "commit instant" is a quantity that a database durably assigns to a transaction to represent its position in the sequence of transactions that the database executed and committed.

A "refresh" operation is performed by the target database system 150 against the source database system 140. A refresh operation allows the source database system 140 to reflect transactions the target database system 150 performed since a last successful refresh operation. Further, the refresh operation allows the target database system 150 to reflect transactions the source database system 140 performed since the last successful refresh operation.

Refresh Operation

Figure 3:
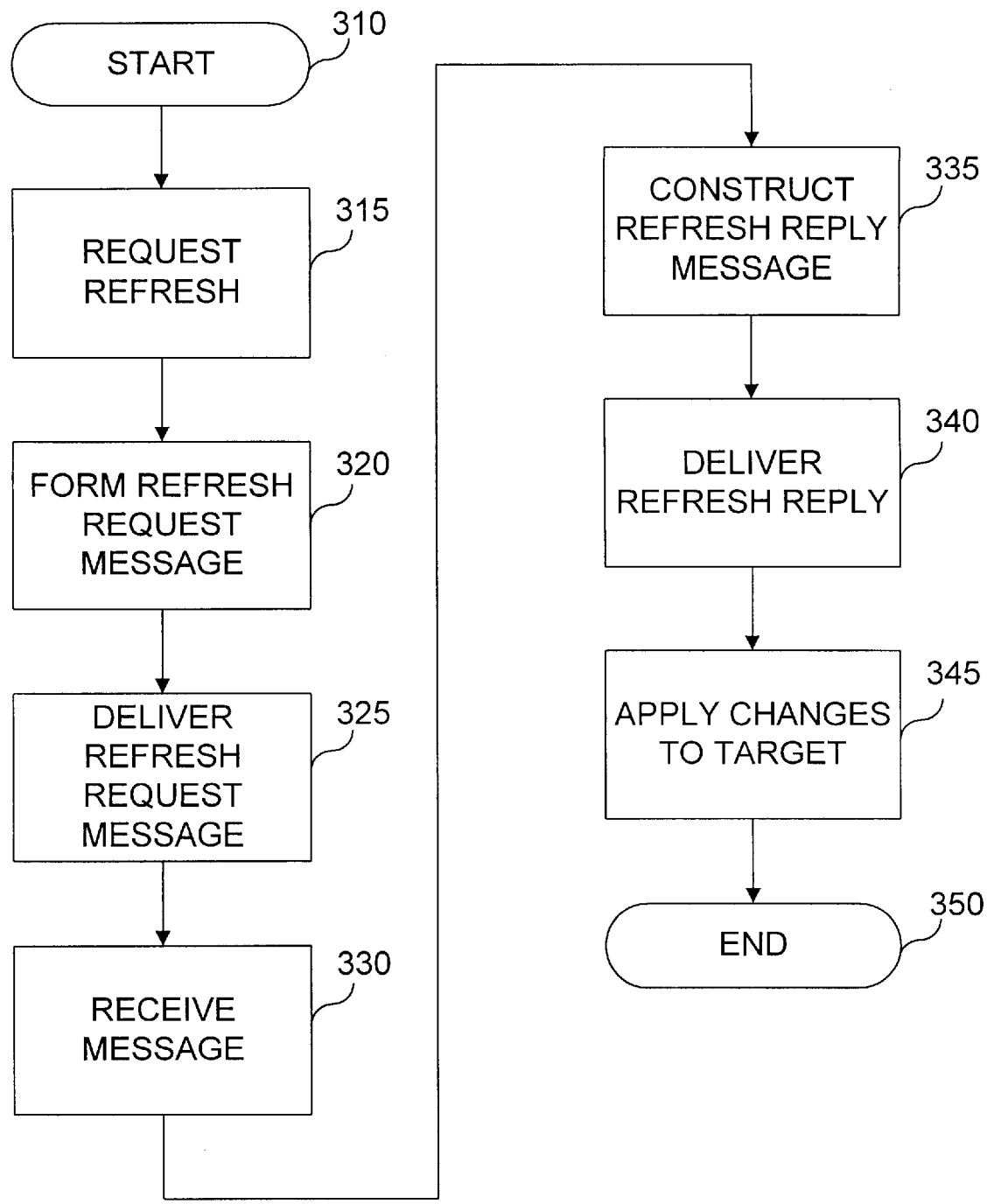
FIG. 3 is a flow diagram illustrating one embodiment of a refresh operation in a replication processing system in accordance with the present invention.

FIG. 3 is a flow diagram illustrating the refresh operation in the replication processing system 205 in accordance with the present invention. When the process starts 310, a user at a client computer 130 requests 310 that a target database system 150 perform a 'refresh' operation or function. The request 310 is made through the replication protocol of the target replication module 256 which refreshes the cached objects that the database module 258 holds. For simplicity, assuming that none of the cached data has changed in the target database system 150, the target replication module 256 forms, or generates, 320 a refresh request message. The target replication module 256 uses the target messaging module 244 to deliver, or send, 325 the refresh request message to the source replication module 246.

The source replication module 246 receives 330 the message and constructs 335 a refresh reply message. The source replication module 246 includes recent changes to the data that the target database module 258 has cached in the refresh reply message. The source replication module 246 obtains these changes from the source database module 248. The source replication module 246 uses the messaging module 244 to deliver 340 the refresh reply message to the target replication module 256. The target replication module 256 applies 345 the changes in the refresh reply message to the target database module 258. This ends 350 the refresh cycle.

Generally, the correctness of the replication protocol of the replication modules 246, 256 hinges on a few basic principles. First, with respect to the source database system 140, a new target database initially matches the state of the source database, and therefore, is also a correct copy. Second, a target database executes the same valid sequence of transactions in the same order. Thus, every copy of the source database remains correct.

As discussed above, the replication protocol operates within a hub and spoke topology with the single source database 140 and any number of target databases 150. A consistent global order of transactions is defined to be the order in which the source database system 140 commits the transactions. Further, the source database system 140 runs all relevant consistency checks whenever it applies a transaction. Thus, the source database system 140 is always correct.

A target database system 150 initially contains a copy of the source database system 140 at a given instant. For purposes of discussion, the given instant will be referred to as the source copy instant ("SCI"). The target database system 150 reflects all the transactions committed by the source database system 140 up to and including the SCI. It is noted that because the target database initially matches a correct source database state the target database is also considered to be correct.

At any time, the target database system 150 may execute the refresh operation to make its copy of the source database more current, i.e., match a more recent state of the source database. If the target database system 150 has not executed any transactions that changed the copied data, it still matches the state of the source database at the SCI. The target database is considered to be in a "pure" state and it matches the source database at the SCI. During the refresh operation, the target database system 150 applies the same sequence of transactions that the source database system 140 applied since the last SCI. This transforms the target from a first pure state to a second, more recent, pure state.

Specifically, when the source database system 140 receives 330 the refresh request message, which includes the target database system 150 SCI, it constructs 355 the refresh reply message. FIG. 4 is a flow diagram illustrating one embodiment for constructing the refresh reply message in the data processing system 205 accordance with the present invention.

At the start 410 the source database system 140 retrieves 415 a list of transactions that it has applied since the SCI of the target database. The transactions in the list appear in the order the source database system 140 committed them. Once the source database system 140 retrieves 415 the list of transactions, it establishes 420 a new SCI for the target database system 150, as is further described below. The source database system 140 is now ready 430 to deliver 340 the refresh reply message 340.

FIG. 5 is a flow diagram illustrating one embodiment of application of the refresh reply message in the replication processing system 205 in accordance with the present invention. Specifically, at the start 510, the target database system 150 receives 515 the refresh reply message from the source database system 140. The target database system 150 effectively undoes its transactions since the last SCI by returning 520 the target database to a state of the last SCI.

The target database system 150 then applies 525 the list of transactions from the refresh reply message to the target database in the same order as the transactions were applied to the source database. These transactions include the transactions applied to the target database after the last SCI and that were sent to the source database system 140 in the refresh request message. In addition, the SCI is saved for future reference by the replication data processing system 205.

The result 530 is that the target database now matches the source database so that the refresh operation transformed the target database from a pure state to a more recent pure state. The transformation applied to the target database the same changes the source database system 140 applied to the source database in the same order as in the list of transactions.

The present invention advantageously performs a transformation to a target database to create a pure state for that target database so that it remains correct. Further, because each target database system 150 uses the same refresh operation, the present invention beneficially allows the source database system 140 to define the global serial order for all transactions in the data processing system 105.

Figure 6A:
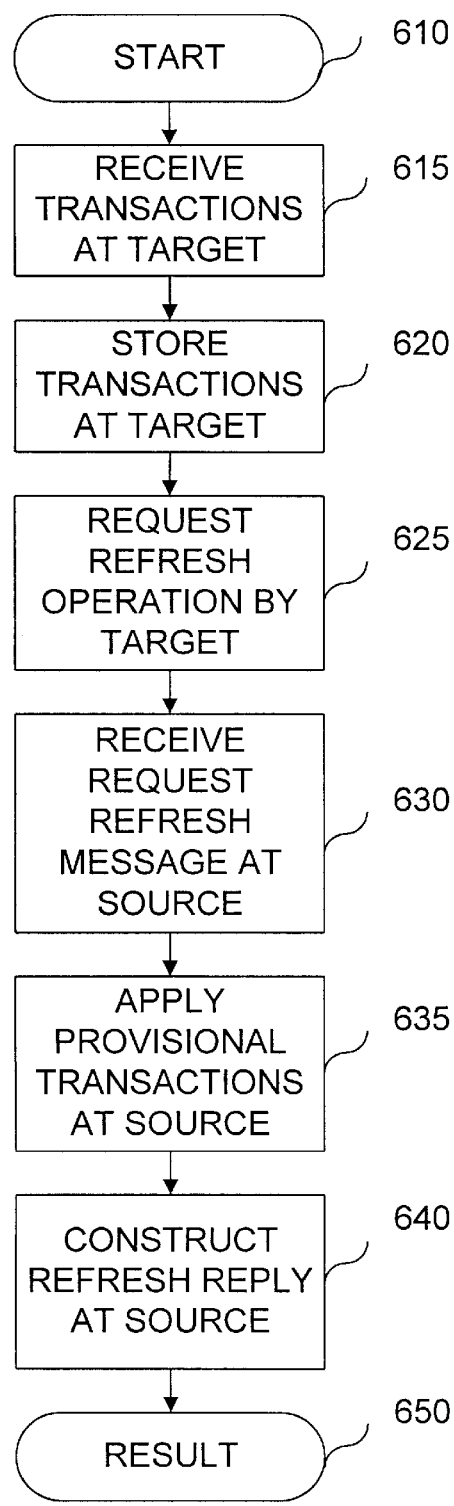
FIG. 6a is a flow diagram illustrating one embodiment of a refresh operation for transaction applied to the target database, but not the source database, in a replication processing system in accordance with the present invention.

FIG. 6a is a flow diagram illustrating one embodiment of the refresh operation for transactions applied to the target database, but not the source database, in the replication processing system 205 in accordance with the present invention. When one or more transactions are applied to a target database, but not the source database, the target database is no longer in a pure state because it contains transactions that the source database system 140 has not yet committed to the source database. The transactions that are applied to the target database system 150 are, therefore, provisional and may later be rejected by the source database system 140.

At the start 610, the target database has received 615 the one or more transactions. The target database system 150 stores 620 the provisional transactions until it requests 625 a refresh operation as described above. The refresh request message includes all the transactions provisionally applied by the target database. The source database system 140 receives 630 the refresh request message and applies 635 provisional transactions to the source database system 140. The source database system 140 now begins construction 640 of the refresh reply message as described above to generate its result 650.

Specifically, as described above with respect to FIG. 4, the source database system 140 retrieves 415 the list of transactions that the source database system 140 has applied since the original SCI. The list of transactions includes the recently provisional target transactions that the replication data processing system 205 just applied to the source database system 140. As described above, the transactions in the list of transactions appear in the order that the source database system 140 committed those transactions. The target database system 150 stores the new SCI when it applies 520 the last transaction in the list of transactions as described above.

Figure 6B:
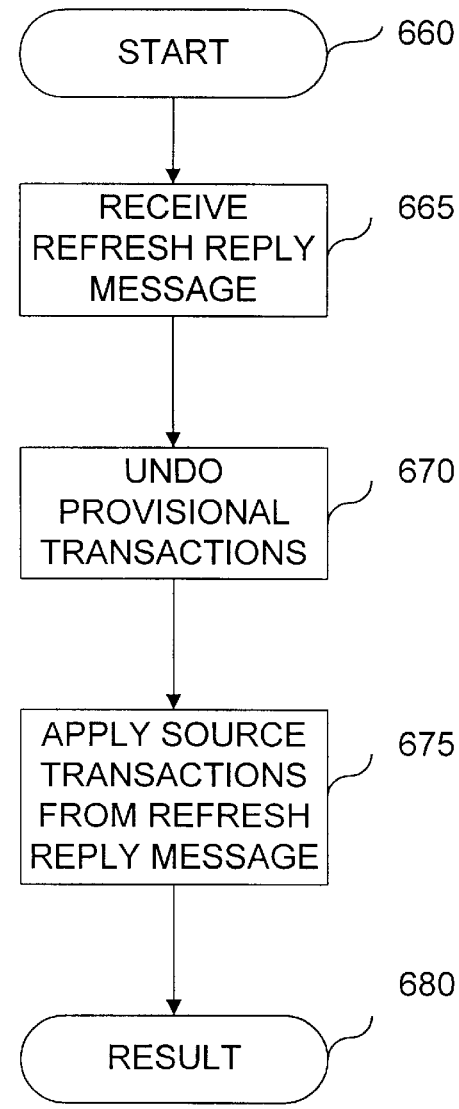
FIG. 6b is a flow diagram illustrating a process for updating a target database system upon receiving a refresh reply message from a source database system in a replication processing system in accordance with the present invention.

FIG. 6b is a flow diagram illustrating a process for updating the target database system 150 upon receiving the refresh reply message from the source database system 140 in the replication processing system 205 in accordance with the present invention. In particular, at the start 660 of this process, the target database system 150 receives 665 the refresh reply message from the source database system 140.

The target database system 150 undoes any provisional transactions so that the target database is returned to the last pure state that matches the old SCI of the source database. The target database system 150 then applies 675 the source transactions from the list of transactions in the refresh reply message. These transactions were those performed by the source database system 140 since the old SCI of the source database. The result 680 is that the target database now includes the source transactions.

When the source database system 140 applies the target database's provisional transactions, the transactions become "durable" and are assigned a place in the global serial order. In implementation terms, the source database includes the target database's transactions in its ordered list of transactions.

The replication protocol of the present invention advantageously provides an understandable transactional consistency model. That is, the replication protocol makes it beneficially convenient to produce applications because the target database is a correct copy of the source database. Moreover, the replication protocol makes it easy to verify that applications running within the data processing system 105 are correct because the target database is a correct copy of the source database.

Figure 6C:
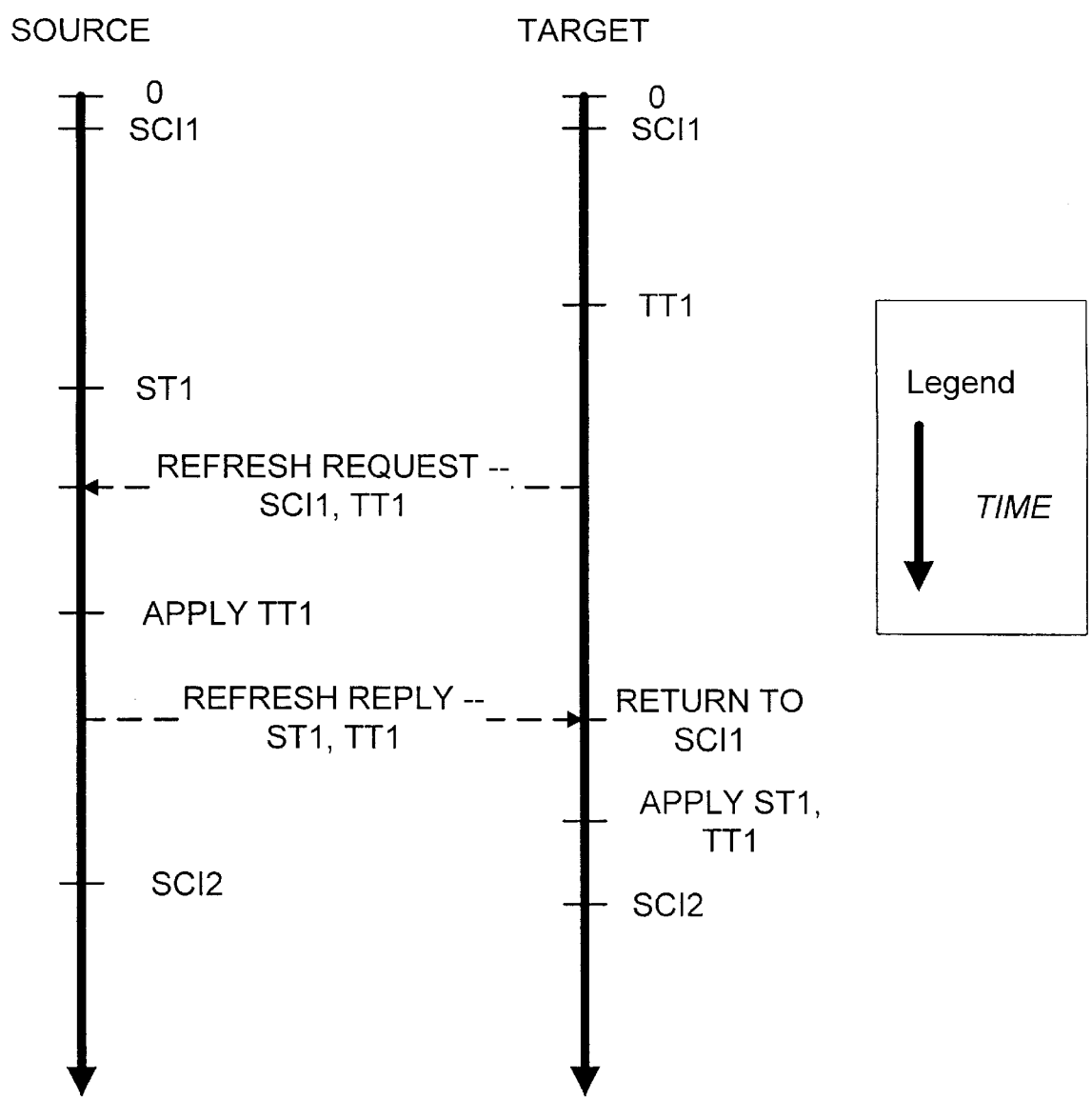
FIG. 6c is a timing diagram illustrating one example for application of transactions applied to both a source database and a target database.

FIG. 6c is a timing diagram illustrating one example for application of the transactions described above in FIGS. 6a and 6b with respect to both the source database and the target database. It is noted that for this example the initial SCI, or initial pure state, for both the source database system 140 and the target database system 150 is SCI1. After application of the transactions as described above, the new SCI, or new pure state, will be SCI2. Further, the target transactions, which are provisional, are identified as TT and the source transactions are identified as ST.

"Consistency" Properties

The present invention includes full ACID property guarantees for all transactions that the source database system 140 commits. In addition, the present invention includes full atomic and consistency property guarantees for transactions that the target database system 150 commits. Further, because the source database system 140 rejects any transaction that would cause it to become inconsistent, the target database system 150 transaction remains provisional until the source database system 140 commits it.

The target database system 150 includes a limited independence property guarantee for provisional transactions. Provisional transactions in the target database system 150 will not see changes from any transactions that are uncommitted. Provisional transactions in the target database system 150 may, however, see changes from other provisional transactions. In addition, there is a limited durability property guarantee for transactions. That is, transactions in the target database system 150 remain provisional until the source database system 140 commits them. Provisional transactions that would make the source database inconsistent will be rejected. The replication processing system 205 replaces a rejected transaction with a special system transaction that logs an error in both the source database system 140 and the target database system 150.

Messaging

Figure 7:
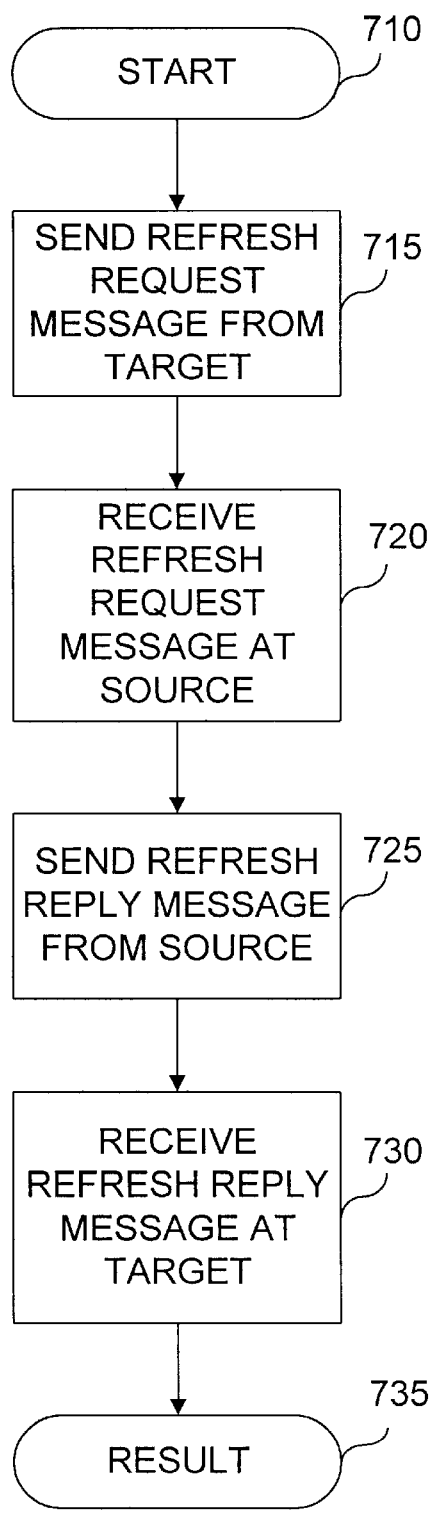
FIG. 7 is a flow diagram illustrating one embodiment of operation of a messaging module in a replication processing system in accordance with the present invention.

FIG. 7 is a flow diagram illustrating a more detailed description of the messaging module 244, 254 in the replication processing system 205 in accordance with the present invention. As described above, the target database system 150 exchanges information with the source database system 140 in order to create or refresh its copy of the source database. The information is exchanged by the replication protocol through messages exchanged between the target database system 150 and the source database system 140.

Specifically, at the start 710 the messaging module 254 of the target database system 150 sends 715 the refresh request message, including the old SCI, to the source database system 140. The refresh request message is received 720 by the messaging module 244 of the source database system 140. The refresh request message includes the list of provisional transactions that the source database system 140 must apply to the source database. As described above, in response the source database system 140 constructs an appropriate refresh reply message to the refresh request message, to send to the target database system 150.

Specifically, the source database system 140 responds through the messaging module 244 sending 725 a refresh reply message to the target database system 150. As described above, the refresh reply message includes the list of transactions applied to the source database that the target database system 150 must apply to the target database. The refresh reply message also includes, as also describe above, the new SCI that the target database system 150 stores.

The refresh reply message is received 730 by the messaging module 254 of the target database system 150. As a result 735 of the interaction between the messaging modules 244, 254, the replication module 256 returns the target database to the pure state of the old SCI, performs the source transactions, performs the stranded transactions, and saves the new SCI. The stranded transactions are further described below.

Data Subsetting

The replication processing system 205 also supports data subsetting. In particular, the source database system 140 database copy may contain a large amount of source database data, while the copy of the source database (the target database) at the target database system 150 may include only a small subset of that data. The replication protocol allows the target database system 150 to copy a subset of the source database. The target database system 150 may limit what is copied, for example, one or more columns from a particular table.

Data Space Management

The present invention also manages data space within the data processing system 105. The target database system 150 depends on the source database system 140 to provide the list of transactions that the source database system 140 applied since the last SCI. Over time, as the source database system 140 applies transactions, the space needed within the system to store the list of transactions grows larger. To manage the need for data space, the replication processing system 205 includes a process that determines how long a target database system 150 may safely wait between refresh operations which is referred to as a guaranteed refresh interval ("GRI").

As discussed above, the target database system 150 stores the SCI. During the refresh operation the source database system 140 sends to the target database system 150 transactions after this instant (the SCI). Space management is also taken into consideration for this interaction. For example, consider a source database system 140 that does not apply a transaction to the source database for more than the guaranteed refresh interval. The source database may not have any transactions in the refresh reply message for the target database. If the source database system 140 does not apply transactions to the target database's subset of the source database copy, the source database appears the same to the target database system 150.

For the source database system 140, the last transaction committed that changes the copy is outside a particular refresh interval. In other words, one target database system 150 using this commit instant as the SCI would be indistinguishable from another target database system 150 that does not perform the refresh operation during the particular refresh interval. Thus, the replication protocol does not use the SCI of the last transaction to change the published data in the source database system 140 as the SCI for the target database system 150. Rather, the source database system 140 manufactures an instant from the time it processes the refresh request message.

The source database system 140 includes the SCI it manufactures in the refresh reply message. The target database system 150 depends on the source database system 140 to provide the list of transactions the source database system 140 applied since the SCI. The source database system 140 has the list of transactions stored as discussed above.

As discussed above, as the source database system 140 applies the transactions, the space needed to store this list of transactions grows and the guaranteed refresh interval helps manage this growth. For example, given a source database system 140 with guaranteed refresh interval, GRI, and a target database system 150 that last performed a refresh operation at a particular time, e.g., time T, the source database system 140 guarantees to hold a sufficient number of transactions in its list of transactions to refresh the target database system 150 until a time, (T+GRI).

It is noted that the limit for the number of transactions in the list of transactions is defined in terms of time rather than in terms of space in order to simplify administration of the target database system 150. Further, it is easier for the target database system 150 to track the passage of time than it is to track consumption of space by the source database system 140.

If the source database system 140 runs out of space by holding the list of transactions, the source database system 140 rejects new transactions and awaits further action by the data processing system 105. For example, the data processing system 105 may have an administrator reduce the guaranteed refresh interval or add space to the source database system 140. The data processing system 105 may also wait until time elapses and the source database system 140 obtains additional space by discarding old transactions from the list of transactions that it no longer needs.

State Names

Figure 8:
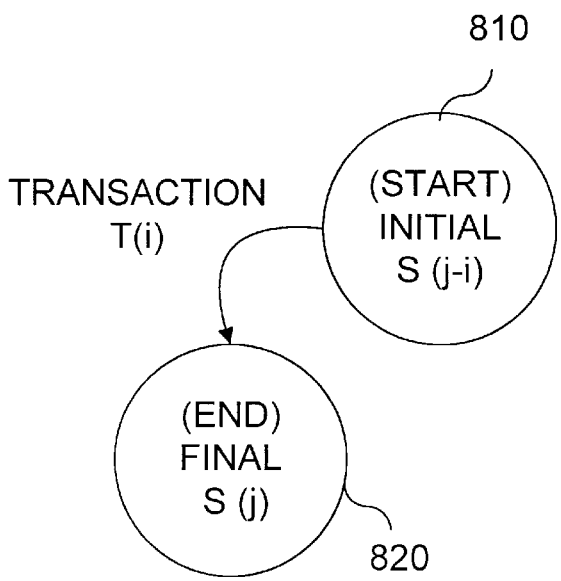
FIG. 8 is a state diagram illustrating one example of a transaction nature of a source database in a replication processing system in accordance with the present invention.

FIG. 8 is a state diagram illustrating one example of the transaction nature of the source database in a replication processing system 205 in accordance with the present invention. It is noted that the copy of the source database is a transactional data set. The copy of the source database begins in an initial state. A sequence of transactions causes the copy to pass through a sequence of states. For example, a transaction, T(i), transforms the copy of the source database from an initial state, S(j−1), 810 to a final state, S(j) 820. A S(j−1) is referred to as T(i)'s initial state and S(j) is referred to as T(i)'s final state. Every state S(j) (other than the initial state) corresponds to a unique transaction T(i), where T(i) is the transaction that placed the database in state S(j). Thus, a particular state S(j) has a particular transaction, T(i).

The replication system of the present invention beneficially exploits the correspondence between each state and its associated transaction to construct a particular name for that state. For example, the SCI for the transaction T(i) with the final state S(j) serves as the name, e.g., I(T(I)) for a state S(j). One advantage of constructing the state name in this manner is that given the state name it is easy to determine what transactions that particular state reflects. For example, given two states, S1 and S2, executed in a single copy of the source database with two transactions, T1 and T2, respectively, and two names, I(T1) and I(T2), respectively, the definition of an instant implies that the following relationships hold:

if I(T1)<I(T2), state S1 occurred before state S2;

if I(T1)=I(T2), state S1 is state S2; and if I(T1)>I(T2), state S1 occurred after state S2.

Given the target database state name, the source database system 140 can determine the list of transactions needed for the target database system 150. For example, if the state name for the target database is the SCI, the target database needs transactions that affect the target database and commit after the SCI. Further, recovery processes, such as those described below, rely upon the ability of the target database system 150 to return the target database to a state that is earlier than a state of the source database. Specifically, the target database system 150 returns the target database to a state with a name that is less than or equal to the source database state name.

Slow Messaging

In one embodiment of the present invention, the replication protocol allows for communication between the source database system 140 and the target database system 150 using slow messaging, for example, electronic mail. The time interval between when the target database system 150 sends the refresh request message and when it receives the refresh request reply from the source database system 140 may be long. To enhance database availability, the replication protocol allows applications to update the target database system 150 during this interval.

When the target database system 150 receives the refresh reply message, the list of provisional transactions may include some transactions that have been sent to the source database system 140 in the refresh request message, as well as other transactions that have not been sent because these transactions were committed after the refresh request message was sent. After the target database system 150 applies the list of transactions from the source database system 140, including the provisional transactions received from the target database system 150, the target database system 150 must re-apply any provisional transactions that were committed after transmitting the refresh request message. Further, the target database system 150 must remember that the re-applied transactions are still provisional.

Thus, there may be a long time lapse between when the target database system 150 constructs the refresh request message and when the source database system 140 processes an appropriate refresh request reply. During this time, transactions may continue to be processed at the client computer target database system. These transactions, however, are provisional and are referred to as "stranded" transactions during this period. Nonetheless, these stranded transactions are yet to be processed by the replication processing system 205.

Figure 9:
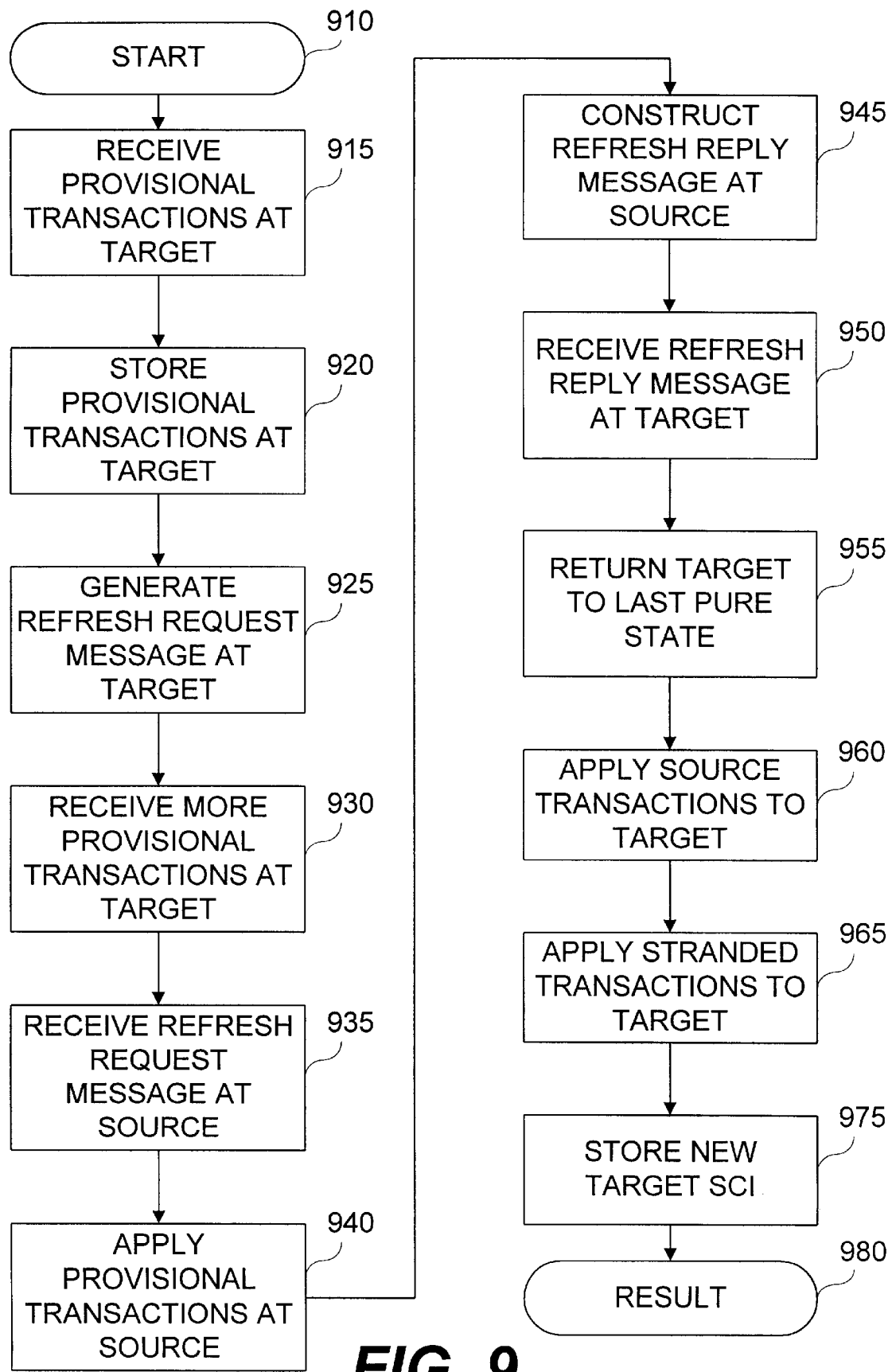
FIG. 9 is a flow diagram illustrating processing of stranded transactions in conjunction with a refresh operation in a replication processing system in accordance with the present invention.

FIG. 9 is a flow diagram illustrating processing of the stranded transactions in conjunction with a refresh operation in the replication processing system 205 in accordance with the present invention. To start 910, as described above, transactions are typically received 915 at the target database system 150. These transactions are provisional and are stored 920 in storage at the target database system 150. When the target database system 150 requests the refresh operation, it generates 925 a refresh request message that includes provisional transactions to date.

Once the refresh request message is sent to the source, additional provisional transactions continue to be received 930 by the target database system. As noted above, these are stranded transactions because the target database system 150 is performing them after it already sent the refresh request message. The target database system 150 stores these stranded transaction in storage.

As discussed above, at the source database system 140, the refresh request message is received 935 and the provisional transactions are applied 940 to the source database. The source database system 140 constructs 945 and transmits the refresh reply message to the target database system 150. The target database system 150 receives 950 the refresh reply message and returns 955 the target database to the last pure state. The target database system 150 applies 960 the source transactions from the refresh reply message to the target database.

After applying 960 the source transactions, the target database system 150 applies 965 the stranded transactions in storage to the target database. The target database system 150 stores 975 the new target SCI, where the new SCI is based on transactions applied from the refresh reply message before the stranded transactions are applied. The result 980 of the process is successful application of stranded transactions to the target database. These transactions are now ready to be applied to the source database in the next refresh operation.

Disaster Recovery

The replication protocol of the present invention also allows for fast, efficient disaster recovery, for example, when the source database recovers from a backup and loses some recent transactions. The replication protocol automatically restores agreement for the target databases of each target database system 150 without requiring separate database administration.

In one embodiment, the replication protocol is extended with two extensions. The first extension includes "detection" and allows the target database system 150 to detect that the source database system 140 has recovered after being disabled and has possibly lost some transactions. The second extension includes "correction" and allows the target database system 150 to return to a valid pure state. Because the valid pure state includes no transactions that the source database system 140 lost, the target database system 150 may resume normal operation. The two extensions are described in further detail below.

Turning first to the detection process, generally, each database includes a generation name. The generation name is a unique identifier for that database. Restoring the database from a backup of the database changes the generation name. Thus, the generation name provides identification as to when a particular database has been restored from its backup.

The replication protocol keeps correct by beneficially not allowing generation names to repeat. If the generation name is repeated, it could not be used to determine if the database had been restored from its backup. Because generation names do not repeat, it is incorrect to construct the generation name from a counter stored in the database. The counter itself gets reset when a database is restored from the backup.

In one embodiment, the replication protocol uses the UUID (described above) for a generation name.

Figure 10:
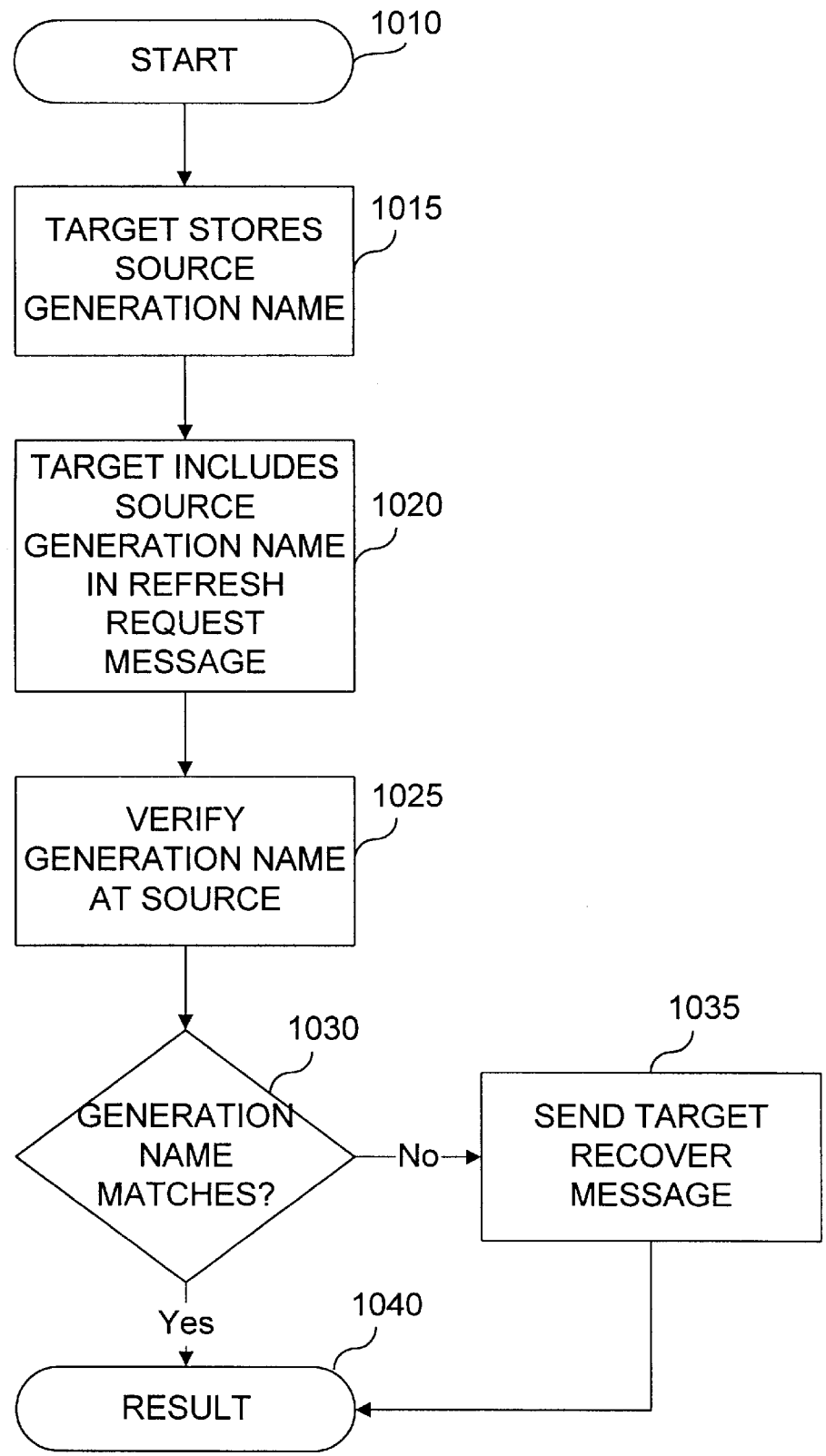
FIG. 10 is a flow diagram illustrating a detection process for a failure in a replication processing system in accordance with the present invention.

FIG. 10 is a flow diagram illustrating the detection process with respect to failures within the replication processing system 205 in accordance with the present invention. At the start 1010 it is noted that the detection process is extended to the refresh operation as described above. Initially, the target database system 150 stores the generation name of the source database when the target database is created. The target database system 150 then includes 1020 the generation name of the source database in the refresh request message sent to the source database system 140.

When the source database system 140 receives the refresh request message, the source database system 140 verifies 1025 the generation name received from the target database system 150 with the current source database system 140 generation name. If the source database system 140 determines 1030 that the generation names match, the result 1040 is that the source database system 140 processes the refresh request message normally as is described above.

If the source database system 140 determines 1030 that the generation names do not match, the source database system 140 sends 1035 the target database system 150 a recovery message. The recovery message informs the target database system 150 that corrective action must be taken. The result 1040 is that the recovery message contains the new source database system 140 generation name.

Turning next to the correction process, FIG. 11 is a flow diagram illustrating corrective action performed when the target database system 150 receives the recover message from the source database system 140 in the replication processing system 205 in accordance with the present invention. Once the process is started 1110, the replication processing system 205 returns 1115 the target database system 150 to a "recent stable pure state."

The recent stable pure state is a pure state that does not contain any transactions that were lost by the source database system 140. There is a presumption that the source database system 140 recovered from a backup and the target database system 150 returns to the pure state before the backup. After the restore operation, the source database system 140 "remembers" or stores transactions that it performed (but did not lose) after the pure state of the target database system 150. The source database system 140 can also now refresh the target database. This preserves consistency and restores agreement within the replication processing system 205. The recent pure state is further described below.

Next, the target database system 150 extends 1120 the list of provisional transactions to include all target database transactions that the recovered source database may have lost. There is a presumption that when the source database system 140 recovered the source database it went back in time. The source database system 140 may have lost some of the transactions in the target database system 150. The target database system 150, however, recovers these last transactions by resubmitting them to the source database system 140. The potentially lost transactions include any transactions that the source database system 140 applied after the stable pure state.

The target database system 150 also stores 1125 the new source database system 140 generation name that it received in the recover message from the source database system 140. The target database system 150 then starts from the stable pure state to redo 1130 the provisional transactions and make their effect visible at the target database system 150 and the source database system 140 by performing a refresh operation, as described above. It is noted that the target database system 150 rejects provisional transactions that violate database consistency rules and logs errors as needed through this process.

Looking further at the recent stable pure state, the recovery procedure is dependent upon the target database system 150 returning to the stable pure state during the disaster recovery process. There is, however some complexity.

During normal operation, the target database system 150 uses the SCI to identify the source database state. Unfortunately, after the source database system 140 recovers from a backup operation it may repeat a commit instant. This may occur because a stored counter used for constructing the commit instant may get reset to the value stored on the backup. A commit instant produced by the counter after the failure may match or be smaller than a commit instant for a lost transaction. Thus, the commit instant for a transaction the source database system 140 executes after the recovery may match the commit instant for a lost transaction.

For example, the source database system commits a transaction, T1, at an instant, I(T1). The name I(T1) identifies the source database state after T1 commits. Next, the target database system 150 performs a refresh operation. Thus, the target applies T1 and enters a pure state named I(T1). Now, consider that the source database system 140 fails. An administrator recovers the source database system 140 source database from a backup. The transaction T1 is lost and the state I(T1) is no longer a valid source database state. Later, the source database system 140 executes a transaction T1' at instant, I(T1'). Its commit instant, however, matches the commit instant for the lost transaction T1 so that I(T1)=I(T1'). If the target database system 150 performs a refresh operation, the refresh logic could get confused because state I(T1) has the same name as the state I(T1'). Moreover, the state I(T1) falsely appears to be pure and stable.

The present invention enables the target database system 150 to return to the stable pure state after the source database system 140 recovers from a backup by having the replication processing system 205 perform particular procedures during normal operation. The source database system 140 durably stores one or more stable names that correspond to a small number of distinguished states. The names are stable because the source database system 140 does not use them as names for other states later, even after recovering from a backup. In one embodiment the source database system 140 uses UUIDs to serve as stable names.

To associate the particular stable name with the particular state, the source database system 140 executes a marker transaction that contains the stable name. The marker transaction may be executed by the source database system 140 at any time. In one embodiment, the source database system 140 executes the marker transaction as part of an operation that creates a backup copy of the source database, as is further described below.

FIG. 12 is a flow diagram illustrating the marker transaction in the replication processing system 205 in accordance with the present invention. Once the process starts 1210, the source database system 140 creates 1215 a marker for a stable pure state. The source database system 140 stores 1220 the newly created marker. The source database system 140 commits 1225 a transaction as described above. When the transaction commits, the source database system 140 saves 1230 the marker and the commit instant for the transaction with the list of transactions of the source database system 140 that change the data.

The marker and the commit instant are included in the refresh reply message back to the target database system 150. The result 1235 is that the marker transaction corresponds with the source database state at the instant the marker transaction commits so that the target database system 150 can determined the stable pure state. Further, this instant is referred to as the marker state.

Similar to other transactions, the source database system 140 adds the marker transaction to its list of recent transactions. The backup of the source database system 140 contains the recent list of transactions, including marker transactions. As a result, the source database system 140 stores the stable names for the recent marker transactions for when it recovers from the backup. After the source database system 140 completes recovery of the source database, there are sufficient transactions in the source transaction list to process the refresh request message from the target database system 150 that is in any marker state that the source database system 140 stores.

Thus, the marker state is a pure source database state because it contains no lost transactions. In addition, the marker state has a stable name, and hence, is a pure stable state. This allows a target database system 150 to correctly perform the refresh operation. Specifically, by returning the target database to a stable pure state, which is the state the source database was in after a marker transaction, the target database is in agreement and can correctly perform the replication protocol.

During operation of the present invention, the target database system 150 also prepares for a possible failure of source database system 140. Specifically, when the target database system 150 applies the marker transaction it remembers or stores both the stable name as well as its own state. Thus, during normal operation, the target database system 150 keeps a small list of recent stable pure states and their stable names.

In summary, to prepare for a possible source database system 140 failure, source database system 140 and target database system 150 store extra information. Specifically, the source database system 140 stores the marker transactions in its list of transactions. The marker transaction includes the stable name. The target database system 150 stores a small number of the stable names. For each stable name, the target database system 150 also stores the associated pure state.

The source database system 140 includes the list of stable names for all the marker transactions that the source database system 140 stores in the database recovery message. From the list of stable names, the target database system 150 selects the most recent stable state whose name the target database system 150 remembers. The target database system 150 returns to this most recent stable state in the first step of the corrective action procedure described above.

If the target database system 150 does not remember a state whose name the source database system 140 included in the recover message (i.e., there is no overlap between the sets of stable states the two databases store), the target database system 150 cannot perform the refresh operation. Thus, the target database system 150 must make a new copy of the source database. The target database system 150, however, may still submit its provisional transactions to the source database system 140 using a separate mechanism referred to as a submit process.

Figure 13:
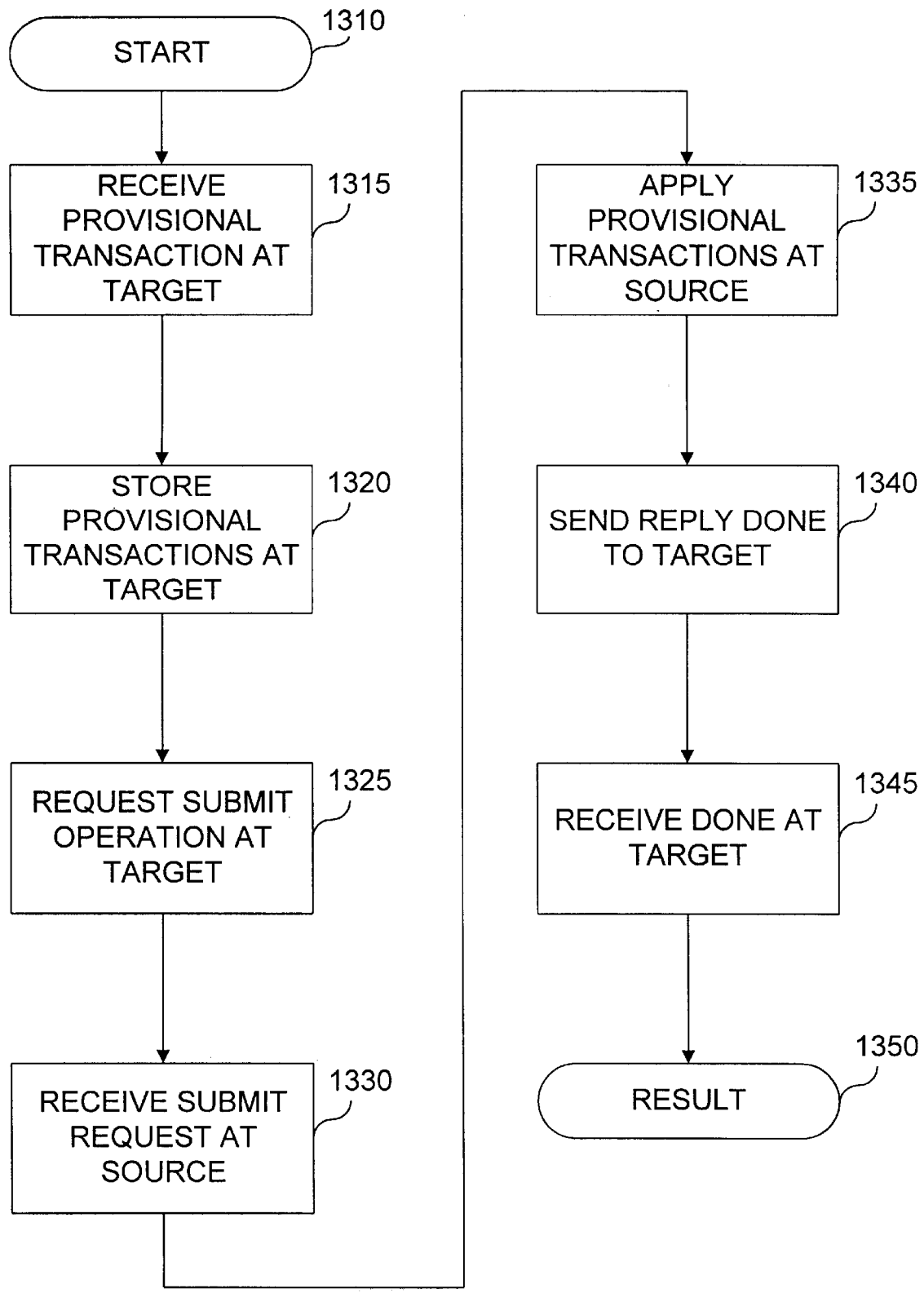
FIG. 13 is a flow diagram illustrating a submit transaction operation in the replication processing system in accordance with the present invention.

The submit process allows the target database system 150 to submit its provisional transactions to the source database system 140 even though the target database system 150 cannot perform a refresh operation. FIG. 13 is a flow diagram illustrating a submit transactions operation in the replication processing system 205 accordance with the present invention. At the start 1310, the target database system 150 receives 1315 provisional transactions similar to that described above. Also as described above, the target database system 150 stores 1320 these provisional transactions in storage.

The target database system 150 requests 1325 a submit operation to the source database system 140. The source database system 140 receives 1330 the submit operation request and applies 1335 the provisional transactions to the source database. Once the provisional transactions are applied, the source database system sends 1340 and the target database system 150 receives 1345 a reply indicating that the operation is done. The result 1350 is that the provisional transactions at the target database system 150 are applied to the source database despite not performing a refresh operation.

Once a source database system 140 database is recovered from a backup, it is possible that it may lose a transaction from the target database system 150. If the target database system 150 stores and resubmits the transaction it will not be lost from within the replication processing system 205. It is noted that if all transactions come from the target database systems 150, no transactions are lost when rebuilding a source database system 140.

The replication protocol of the present invention allows for resubmission of transactions from the target database system 150 that may be lost by the source database system 140. Specifically, for each target database system 150 the source database system 140 stores the particular target database system 150 identification or name and a target instant ("TI") for the target database system 150. It is noted that the TI identifies a given instant in time with respect to the state of the target database.

The stored name may be a UUID as described above. The stored TI indicates the last transaction that occurred in the target database system 150 that is committed by the source database system 140. The recovery message from the source database system 140 includes the TI for the last committed transaction by a particular target database. The target database system 150 extends its list of pending transactions to include all target database system 150 transactions after the TI.

The replication protocol in accordance with the present invention allows for effective space management during the recovery process in the data processing system 105. Generally, a "well-behaved" target database system 150 completes a refresh operation at least as often as the guaranteed refresh interval. The target database system 150 also stores stable pure states within the guaranteed refresh interval of the target database's most recent refresh operation.

When performing corrective action, for example, disaster recovery, the target database system 150 stores the stable pure state that the source database system 140 included in the backup. The target database system 150 only stores stable pure states within the guaranteed refresh interval of the most recent refresh. Thus, the source database system 140 must define the stable pure state once every guaranteed refresh interval to assure that the target database system 150 will always store the most recent stable pure state. To define the stable pure state the source database system 140 executes the marker transaction and makes the backup as described above.

To understand the time interval for the source database system 140 to allow the target database system 150 to perform the refresh operation from the stable pure state, consider an extreme case in which the target database system 150 infrequently performs the refresh operation and the source database system 140 infrequently defines the stable pure state. In this example, a present time may be referred to as TN, the guaranteed refresh interval may be referred to as GRI, and the time of the last refresh operation may be referred to as RT. It may be assumed that the target database system 150 is well behaved. Thus, the last refresh operation was within the guaranteed refresh interval, so that RT>TN−GRI, and the recent stable pure state time may be referred to as RSPST.

The recent stable pure state, RSPST, that the target database system 150 stores must be within the guaranteed refresh interval of the most recent refresh operation by the target database system 150. Specifically, RSPST>RT−GRI and RSPST>TN−2*GRI. During corrective action, the target database system 150 returns to the recent pure state so that the source database system 140 refreshes the target database system 150. The recent pure stable state is not earlier than twice the guaranteed refresh interval before this instance. Thus, the source database system 140 can update or refresh the target database system 150 if it stores transactions in its list for twice the guaranteed refresh interval. It is noted that the source database system 140 need only store transactions since the last marker that is older than the guaranteed refresh interval.

Agreement Verification

As discussed above, the replication protocol of the present invention supports agreement verification in the target database system 150. The target database system 150 includes an instruction indicating that it wants to verify itself in the refresh request message. The source database system 140 executes a verification transaction upon the instruction in the refresh request message. The verification transaction computes and records one or more checksums for the data that the target database system 150 holds. The verification transaction performs proper locking to ensure that it computes checksums for consistent data sets.

It is noted that a checksum is a number computed by applying a function to some data. Every time the function is applied to the same data, the result should be the same. Similarly if the function is applied to different data, the result should usually be different. Thus, in the present invention, the source database system 140 and the target database system 150 are presumed to hold the same data and if a checksum function is applied to both the result should be the same. If the result is different, this may provide a flag to a problem within the replication processing system 205. By using checksums, the present invention allows for comparing copies of the target database with the source database without having to send an entire data set over the computer network 110.

When the target database system 150 applies the verification transaction, the state of the target database should match the state of the source database at the time the source database system 140 applied the verification transaction. The target database contains no provisional transactions at this point. The target database takes advantage of having no provisional transaction and computes checksums for the copied data. If the copy is correct, the checksums in the target database system 150 match the checksums that the source database system 140 computed.

In one embodiment, the replication protocol is implemented through Java data formats. Because the Java representation of data is standard at all nodes in a network, the checksum function does not cope with different and incompatible representations for the same item of data in different databases. Thus, the correctness of this process does not depend on the unit of information undergoing the checksum calculation. A particular implementation may check, for example, whole tables or only row subsets of large tables.

Checksums also may be used to verify meta-data as well as user data. For example, the verification function may indicate that the target database system 150 is not in agreement. The simplest corrective action is to throw away the copy of the source database and create a new copy. This may not be desirable if the copy contains a large volume of data and only a small portion is incorrect. Thus, the replication protocol performs a correction process on the target database system 150.

The correction process includes the target database system 150 having the name of the incorrect item in the refresh request message. For example, a table identification or a table identification with and a predicate such as orders between 1:00 and 1:10. The source database system 140 executes a re-copy transaction that selects the correct data. Finally, the target database system 150 applies the re-copy transaction by applying the correct version of the item that the source database system 140 selected.

Figure 14A:
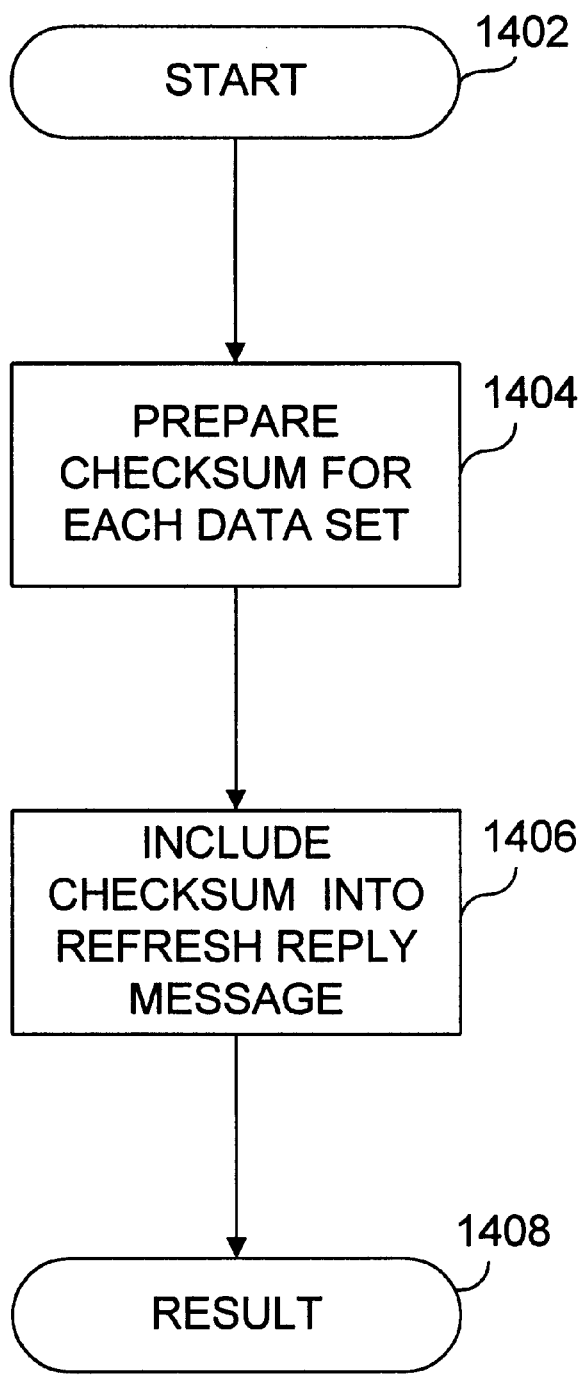
FIGS. 14a and 14b are flow diagrams illustrating a checksum process for a replication processing system in accordance with the present invention.
Figure 14B:
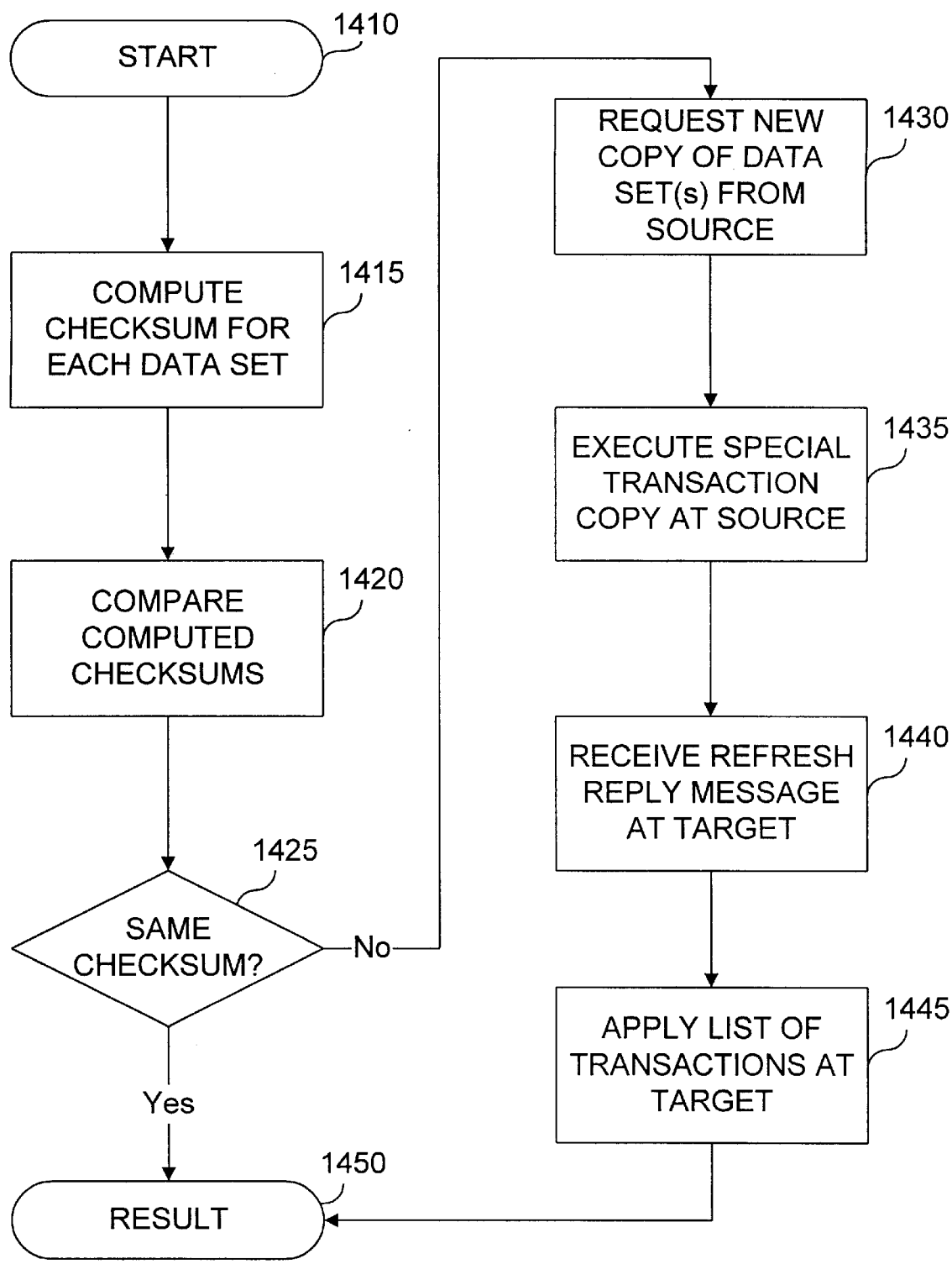

FIGS. 14*a* and 14*b* are flow diagrams illustrating one embodiment of a checksum process for the replication processing system 205 in accordance with the present invention. FIG. 14*a* illustrates the checksum process in which the source database system 140 computes a checksum, using a checksum transaction, with every transaction data set. The checksum is calculated so that it can be provided to the target database system 150.

The process starts 1402 with the source database system 140 receiving a checksum transaction request from the refresh request message. The source database system 140 prepares, or calculates, 1404 the checksum for each requested target data set. The source database system 140 includes 1406 the checksums in a checksum transaction in the refresh reply message. The included checksum transaction holds the checksums that the source database system 140 computed. The result 1408 is that source database system 140 transmits the checksums with the refresh reply message for the target database system 150.

FIG. 14*b* illustrates the checksum process once the target database system 150 receives the checksum transaction. The process starts 1410 with the target database system 150 obtaining the checksum transaction from the refresh reply message. Then for every data set with a checksum in the checksum transaction, the target database system 150 also computes 1415 a checksum. The target database system 150 compares 1420 the computed checksum to the checksum from the source database system 140 for that data set. If the target database system 150 determines 1425 that the checksums match, the target database system 150 concludes that the data sets are in agreement. The result 1440 is that a data set is valid.

If the target database system 150 determines 1425 that the checksums do not match, then the target database system 150 concludes that the data sets are not in agreement (e.g., invalid). In the next refresh request message the target database system 150 requests 1430 a new copy of the data set with the mismatched checksums from the source database system 140. The source database system 140 executes 1435 a special copy transaction in the list of transactions that are sent in the refresh reply message to the target database system 150. The target database system 150 receives 1440 the refresh reply message and applies 1445 the transactions in the list of transactions, including replacing the invalid data set. Thus, the target database system 150 may be repaired without having to re-copy all its data, thereby saving processing resources and time.

Upgrade Process

The replication protocol in accordance with the present invention also allows for proper software upgrade process. The refresh request message includes a target database software version identifier. When the source database system 140 processes the refresh request message it first checks the target database software version based on this identifier. If the target database identifier shows a version that is older than the source database software version, the source database system 140 responds with an upgrade reply.

The upgrade reply includes a upgrade utility enabled by a Java class that implements the upgrade logic, the target database software version identifier after the upgrade, and the information needed by the upgrade utility to upgrade the target application. This information may include more classes used by the upgrade utility, the new system software, and new error messages. It is noted that the upgrade message may be customized to include information specific for any application. This information includes any information that a client computer or a target database system needs to properly upgrade the application.

Also with respect to the information needed by the upgrade utility, the upgrade utility defines the form and content of the information it needs. Having the upgrade utility define the form and content of the information it needs avoids defining a rigid replication protocol now to meet all future upgrade requirements. Thus, application developers have the flexibility to design their own upgrade utility without being limited by the replication processing system 205.

To perform the upgrade process, the target database system 150 processes the upgrade message. Specifically, the target database system 150 reads the upgrade utility class from the upgrade message. The target database system 150 loads the upgrade utility into the target JVM and execute the classes upgrade method. The upgrade utility is then executed by the target JVM. The target database system 150 then provides the message as input.

Figure 15:
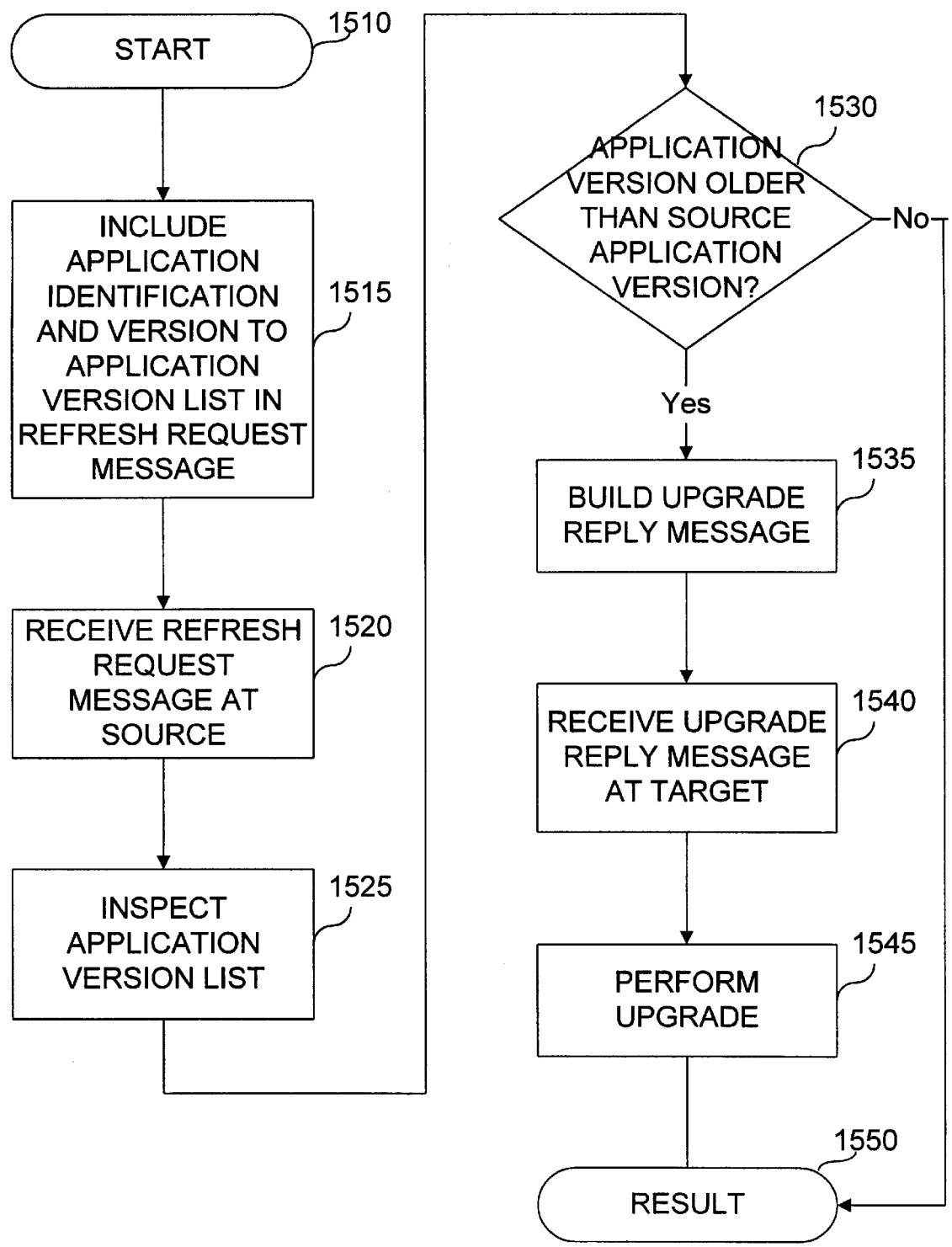
FIG. 15 is a flow diagram illustrating an upgrade process and utility for a replication processing system in accordance with the present invention.

FIG. 15 is a flow diagram illustrating an upgrade process and utility for the replication processing system 205 in accordance with the present invention. At the start 1510 of the process, the target database system 150 includes 1515 an application (or software) identification and an application version to an application version list in the refresh request message. The source database system 140 receives 1520 the refresh request message and inspects 1525 the application version list.

Based on the inspection, if the source database system 140 determines 1530 that the application version is not older than the application version of that application at the source database system 140, then the result 1550 is no upgrade reply is necessary. If the source database system 140 determines 1530 that the application version is older than the application version of that application at the source database system 140, then it builds 1535 an upgrade reply message as described below. The source database system 140 sends, or transmits, the upgrade reply message to the target database system 150 which receives 1540 it and accordingly performs 1545 an upgrade of the application as described below. The result 1550 is that the application is upgraded quickly and efficiently without time consuming operator or user intervention.

Figure 16:
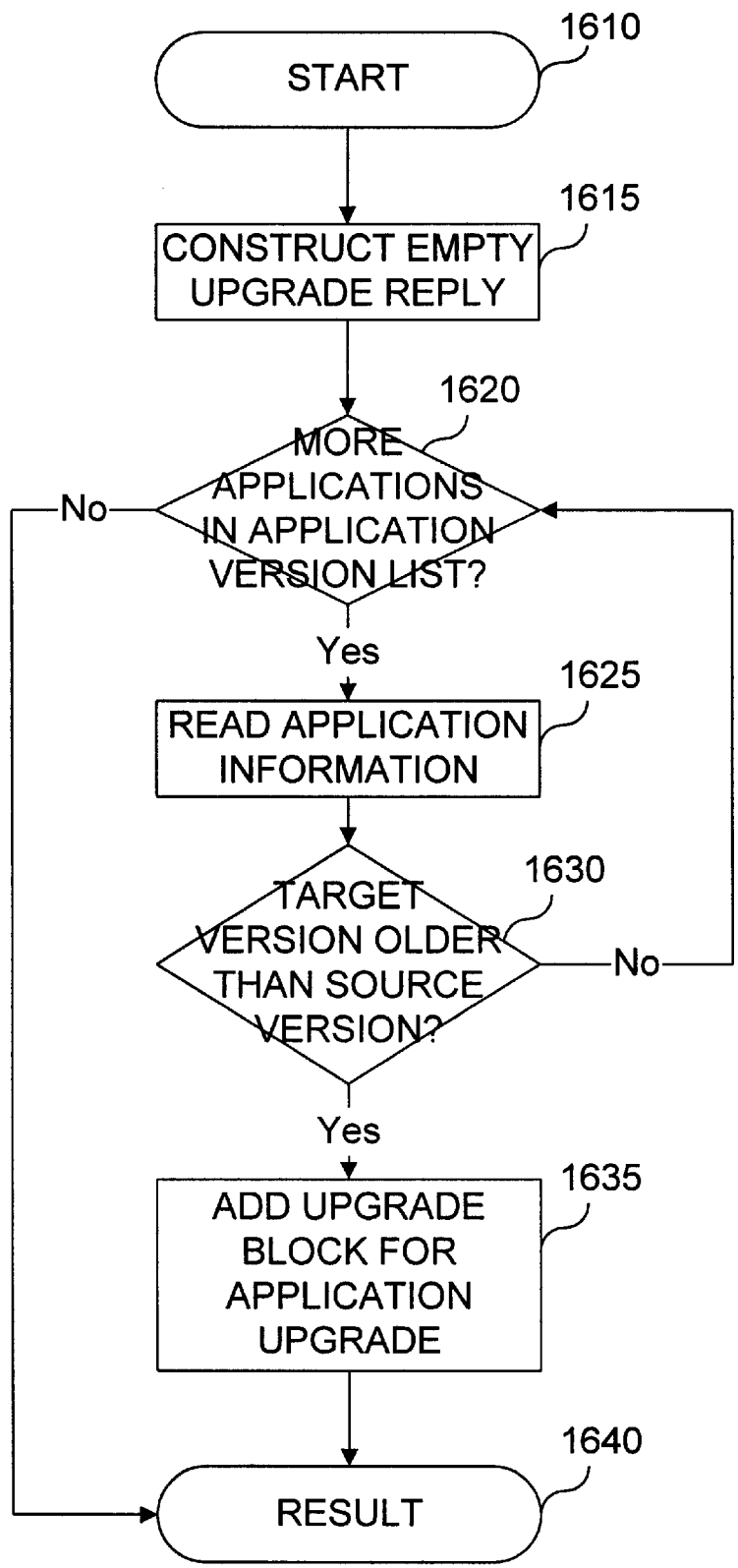
FIG. 16 is a flow diagram illustrating a process for building an upgrade reply message in a replication processing system in accordance with the present invention.

FIG. 16 is a flow diagram illustrating a process for the source database system 140 to build an upgrade reply message in accordance with the present invention. Once the process starts 1610, the source database system 140 constructs 1615 an empty upgrade reply message. The source database system 140 determines 1620 what are the applications in the application version list.

Specifically, the source database system 140 reads 1625 the application from the application version list and determines 1630 if the application version at the target database system 150 is older than the application version at the source database system 140. If the application version at the target database system 150 is older than the version at the source database system 140, an upgrade block is added 1635 to the upgrade reply message for that application. The upgrade block includes application information, including application identification new version, old version, an application specific upgrade utility and application specific information.

If the application version at the target database system 150 is not older than the application version at the source database system 140, then the source database system 140 determines 1620 if there are any more applications in the application version list. Once all the applications are read from the application version list and all the upgrade blocks are added 1635, the process is completed.

The result 1640 is that the source database system efficiently determines what applications at the target database system 150 need upgrading and sends the appropriate upgrade information in the upgrade reply message. It is noted that if an application is not required to be upgraded, the replication data processing system 205 processes the refresh operation as described above.

Figure 17:
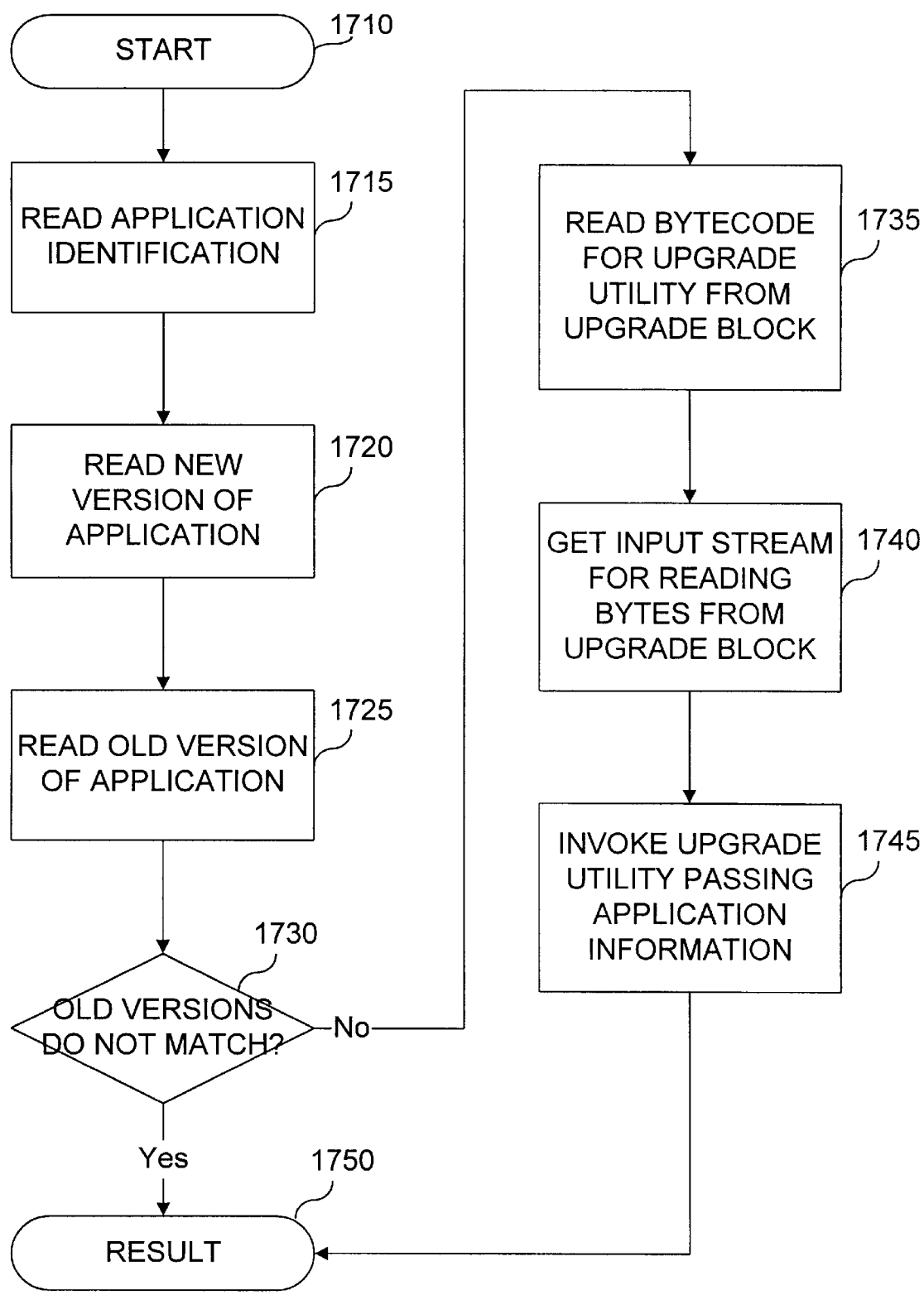
FIG. 17 is a flow diagram illustrating a process for applying an upgrade reply message in a replication processing system in accordance with the present invention.

FIG. 17 is a flow diagram illustrating a process for the target database system 150 to receive and apply the upgrade reply message in accordance with the present invention. Specifically, the process is described with respect to each upgrade block in the upgrade reply message.

At the start 1710 of the process, the target database system 150 receives the upgrade reply message and reads 1715 the application identification information for the upgrade block. Next, the target database system 150 reads 1720 the new application version and reads 1725 the old application version. The target database system 150 determines 1730 if the old application version matches the old application version it holds. If the old application versions do not match, the result 1750 is that the process ends.

If the target database system 150 determines 1730 that the old application versions do match, it reads 1735 the bytecode for the upgrade utility from the upgrade block and loads the utility into the target JVM. The target database system 150 then gets 1740 the Java input stream for reading the remaining bytes from the upgrade block. This is provided by the target database system 150 messaging module 254. It is noted that the content and the meaning of the bytes in the Java input stream are defined through the upgrade utility.

The target database system 150 then invokes 1745 the upgrade utility to pass the application information, including the application identification, the new version, old version and Java input stream information. The result 1750 is that the target database system upgrades its application quickly and efficiently without operator or user intervention.

It is noted that an application depends on many independently developed software components. These include database software, application software and system software such as the Java Development Kit. In addition version dependencies between components are common. For example, version A.X of an application uses a feature introduced in version DB.Y of a database management database. Version A.Y of an application may not work with version DB.Z of a database management system due to a regression or use of a deprecated feature.

Thus, an upgrade must account for all the software an application uses. The replication protocol allows users to upgrade any software component, as well as user data, using a process similar to that described above. Specifically, to upgrade a software component, a user must register the particular information in advance.

Registration is accomplished by writing components for an application that can be registered with the source database system 140. Specifically, these components include a Java class that implements "upgradable" and a Java class to add upgrade information for the application to the upgrade reply message. The replication processing system 205 then allows the application and upgrade information to be registered with the source database system 140. Registration includes providing the application identification, for example, the UUID, the application version, for example, a program string, and the application upgrade utility. One skilled in the art will recognize that new versions of an application maybe registered in the same manner. Finally, an application will be included in a target database copy and includes the application identification and version information.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method for updating a source database and a plurality of target databases so that at a given instant the source database and the plurality of target databases are in agreement, the method comprising:

respectively establishing a plurality of pure states between the source database and the plurality of target databases;

asynchronously receiving at the source database a respective plurality of refresh requests from the plurality of target databases, wherein each refresh request is from a requesting target database and includes any provisional transactions applied to the requesting target database since the requesting target database's last pure state; and asynchronously responding to the plurality of refresh requests from the respective plurality of target databases by:

applying any provisional transactions from the requesting target database to the source database;

providing the requesting target database with the transactions applied to the source database since the last pure state of the requesting target database including any provisional transactions applied to the requesting target database;

restoring the requesting target database to its last pure state; and applying to the requesting target database the transactions applied to the source database since the last pure state of the requesting target database.

2. The method of claim 1, further comprising establishing a more recent pure state for each requesting target database in response to applying the source transactions from the source database to the requesting target database.

3. The method of claim 1, further comprising:

collecting a stranded transaction at a requesting target database; and applying the stranded transactions to the requesting target database after applying the transactions from the source database to the requesting target database.

4. The method of claim 1, further comprising:

performing a checksum transaction with each transaction applied to the source database to generate a source checksum; and providing the source checksum to each requesting target database upon responding to the target database's refresh request.

5. The method of claim 4, further comprising:

performing a checksum transaction with each source transaction applied to the requesting target database to generate a target checksum;

comparing the target checksum with the source checksum; and re-providing a source transaction from the source database to the requesting target database in response to the target checksum and the source checksum being mismatched.

6. A method for restoring agreement between a source database and a target database in the event of a failure, the method comprising:

receiving a refresh request from the target database, the refresh request containing a target generation name identifying a stable pure state of the source and target databases;

verifying agreement between the target generation name and a source generation name stored at the source database; and recovering the source database in response to a mismatch between the source generation name and the target generation name.

7. The method of claim 6, wherein the step of recovering the source database comprises:

receiving the source generation name at the target database;

extending the list of provisional transactions stored by the target database to include all transactions stored by the target database since the stable pure state identified by the source generation name; and performing a refresh operation to commit the extended list of provisional transactions stored at the target database on the source database in order to recover the source database.

8. The method of claim 7, further comprising:

periodically performing a marker transaction at the source database, the marker transaction identifying a pure state of the source and target databases by a source generation name;

storing the source generation name at the source database and supplying the source generation name to the target database in response to a refresh request from the target database.

9. The method of claim 8, wherein the stable pure state is identified by a UUID.

10. In a replication processing system having a source system and a target system, a method for upgrading an application in the target system comprising:
   providing an application identifier and a source application version for the application at the source system;
   receiving a target application version from the target system;
   building an upgrade packet in response to the target application version being older than the source application version;
   providing the upgrade packet to the target system; and
   performing an upgrade of the application at the target system in response to receiving the upgrade packet.

11. The method of claim 10, wherein the upgrade packet further comprises the application identifier, the source application version, the target application version, an application upgrade utility and data bytes for upgrading the application.

12. The method of claim 11, wherein the step of performing the upgrade at the target system further comprises:
   reading the application identifier from the upgrade packet;
   reading the source application version and the target application version from the upgrade packet; and
   reading the bytes from the upgrade packet for upgrading the application in response to the target application version from the upgrade packet matching the target application version at the target system.

13. A computer program product, implemented on a machine readable medium, comprising instructions operable to cause a programmable processor to:
   respectively establish a plurality of pure states between a source database and a plurality of target databases;
   asynchronously receive at the source database a respective plurality of refresh requests from the plurality of target databases, wherein each refresh request is from a requesting target database and includes any provisional transactions applied to the requesting target database since the requesting target database's last pure state; and
   asynchronously respond to the plurality of refresh requests from the respective plurality of target databases by:
      applying any provisional transactions from the requesting target database to the source database;
      providing the requesting target database with the transactions applied to the source database since the last pure state of the requesting target database including any provisional transactions applied to the requesting target database;
      restoring the requesting target database to its last pure state; and
      applying to the requesting target database the transactions applied to the source database since the last pure state of the requesting target database.

14. The computer program product of claim 13, further comprising instructions operable to cause the programmable processor to:
   collect a stranded transaction at a requesting target database; and
   apply the stranded transaction to the requesting target database after applying the transactions from the source database to the requesting target database.

15. The computer program product of claim 13, further comprising instructions operable to cause the programmable processor to:
   periodically perform a marker transaction at the source database, the marker transaction identifying a pure state of the source and target databases by a source generation name; and
   store the source generation name at the source database and supply the source generation name to the target database in response to a refresh request from the target database.

16. The computer program product of claim 13, further comprising instructions operable to cause a programmable processor to:
   compute a source checksum at the source database for each source transaction; and
   provide each source transaction and the source checksum for each source transaction to the target database upon responding to the requesting target database's refresh request.

17. The computer program product of claim 16, further comprising instructions operable to cause a programmable processor to:
   perform a checksum transaction with each source transaction applied to the requesting target database to generate a target checksum;
   compare the target checksum with the source checksum; and
   re-provide a source transaction from the source database to the requesting target database in response to the target checksum and the source checksum being mismatched.

18. The computer program product of claim 15, further comprising instructions operable to cause the programmable processor to:
   receive a refresh request from the target database containing a target generation name identifying a stable pure state of the source and target databases;
   verify agreement between the target generation name and a source generation name stored at the source database; and
   recover the source database in response to a mismatch between the source generation name and the target generation name.

19. The computer program product of claim 18, further comprising instructions operable to cause the programmable processor to:
   receive the source generation name at the target database;
   extend the list of provisional transactions stored by the target database to include all transactions stored by the target database since the stable pure state identified by the source generation name; and
   perform a refresh operation to commit the extended list of provisional transactions stored at the target database on the source database in order to recover the source database.

20. A computer program product, implemented on a machine readable medium, containing instructions operable to cause a programmable processor to:
   provide an application identifier and a source application version for an application at a source system;
   receive a target application version from a target system;
   build an upgrade packet in response to the target application version being older than the source application version;
   provide the upgrade packet to the target system; and
   perform an upgrade of the application at the target system in response to receiving the upgrade packet.

21. The computer program product of claim 20, wherein the upgrade packet further comprises the application identifier, the source application version, the target application version, an application upgrade utility and data bytes for upgrading the application.

22. The computer program product of claim 21, wherein the instructions to perform an upgrade at the target system further comprises instructions to:

read the application identifier from the upgrade packet;

read the source application version and the target application version from the upgrade packet; and read the bytes from the upgrade packet for upgrading the application in response to the target application version from the upgrade packet matching the target application version at the target system.

* * * * *